United States Patent [19]

Tanaka et al.

[11] Patent Number: 5,099,262

[45] Date of Patent: Mar. 24, 1992

[54] CAMERA HAVING SOUND RECORDING FUNCTION

[75] Inventors: Yoshito Tanaka; Hiroyuki Okada; Yoshihiro Tanaka; Nobuyuki Taniguchi; Shinji Tominaga, all of Osaka, Japan

[73] Assignee: Minolta Camera Kabushiki Kaisha, Osaka, Japan

[21] Appl. No.: 389,870

[22] Filed: Aug. 4, 1989

[30] Foreign Application Priority Data

| Dec. 29, 1988 | [JP] | Japan | 63-332289 |
| Dec. 29, 1988 | [JP] | Japan | 63-332290 |
| Dec. 29, 1988 | [JP] | Japan | 63-332291 |
| Dec. 29, 1988 | [JP] | Japan | 63-332292 |
| Feb. 10, 1989 | [JP] | Japan | 1-31583 |
| Mar. 14, 1989 | [JP] | Japan | 1-63202 |
| Mar. 14, 1989 | [JP] | Japan | 1-63203 |
| Mar. 14, 1989 | [JP] | Japan | 1-63205 |
| Mar. 14, 1989 | [JP] | Japan | 1-63206 |
| Mar. 14, 1989 | [JP] | Japan | 1-63208 |
| Mar. 14, 1989 | [JP] | Japan | 1-63209 |

[51] Int. Cl.$^5$ .......................................... G03B 17/24
[52] U.S. Cl. .................................... 354/106; 358/909
[58] Field of Search ................. 354/105, 106, 109, 76, 354/75, 202, 195.1, 195.12, 187, 418; 352/1; 358/335, 906, 909

[56] References Cited

U.S. PATENT DOCUMENTS

| 4,270,853 | 6/1981 | Hatada et al. | 354/76 |
| 4,777,507 | 10/1988 | Dunsmore et al. | 354/418 |
| 4,814,813 | 3/1989 | Yamamoto et al. | 354/418 |
| 4,827,296 | 5/1989 | Haraguchi et al. | 354/187 |
| 4,897,732 | 1/1990 | Kinoshita et al. | 358/335 |
| 4,905,029 | 2/1990 | Kelly | 354/106 |

FOREIGN PATENT DOCUMENTS

| 61-81092 | 4/1986 | Japan |
| 61-133780 | 6/1986 | Japan |
| 61-253981 | 11/1986 | Japan |
| 61-274588 | 12/1986 | Japan |
| 61-277281 | 12/1986 | Japan |
| 61-278279 | 12/1986 | Japan |
| 62-945 | 1/1987 | Japan |
| 62-165766 | 7/1987 | Japan |
| 62-274990 | 11/1987 | Japan |
| 62-296681 | 12/1987 | Japan |
| 63-48084 | 2/1988 | Japan |

Primary Examiner—L. T. Hix
Assistant Examiner—David M. Gray
Attorney, Agent, or Firm—Burns, Doane, Swecker & Mathis

[57] ABSTRACT

A camera has a function of recording sounds as well as recording images. In this camera, in a self mode in which photographing is executed using a self timer, sounds are recorded during counting of the self timer and in a usual photographing mode in which no self timer is used, sounds are recorded after completion of the photographing. These two modes are changed over automatically according to a selection of one mode. When a user fails to record sounds in the sound recording operation in this camera, the sounds in correspondence with related recorded images can be recorded again from the beginning by operating a reset means. Further, the recording time can be elongated by operating a means for changing over the recording mode during the sound recording operation.

13 Claims, 18 Drawing Sheets

CAMERA HAVING SOUND RECORDING FUNCTION

BACKGROUND OF THE INVENTION

The present invention relates to a camera having a sound recording function.

In conventional sound recording devices in a still video camera having a function of photographing using a self timer and a sound recording function, one time of sound recording is set at 9.6 seconds due to the recording capacity of a magnetic floppy disk, and a count time of a self timer is usually set at 10 seconds. And recording is executed generally after the completion of image photographing. As a result, one time of photographing and sound recording requires a rather long time. Further, when sound recording is executed after the completion of photographing in photographing using a self timer, it takes substantially 20 seconds from the first starting time of the self timer.

As shown in Japanese Laid-Open Patent Publication No. 61-133780, a system is known in which a first and a second timers are provided, and photographing is executed after the count time of the first timer passes while sound recording is executed after the count time of the second timer passes. Further, as shown in Japanese Laid-Open Patent Publication No. 61-253981, a system is known in which timings of exposure operation in photographing and sound recording can be optionally set by hand.

However, in these systems, though the timings of photographing and sound recording can be separately set respectively, these timings cannot be set in relation to a mode in which photographing using a self timer is executed (hereinafter referred to as a self mode) and a mode in which photographing not using any self timer is executed (hereinafter referred to as a usual photographing mode). Therefore, it takes a long time for a user to set the timings of photographing and sound recording, and such a camera cannot be easily operated.

Further, as shown in Japanese Laid-Open Patent Publication No. 62-945, a system is known in which sound recording is executed during counting of a self timer. However, in this device, sound recording is not executed for an initial predetermined time, and sound recording is started after the predetermined time has passed. And further, no suggestion is given relating to the way how to set these timings in accordance with the changeover between the self mode and the usual photographing mode.

In conventional devices, when a user wishes to record the sounds again from the beginning, the image recording need to be executed again from the beginning. And it is difficult to do only the sound recording over again with keeping the recorded images as they are.

As shown in Japanese Laid-Open Patent Publication No. 61-274588, an art is proposed in which, in order to elongate a sound recording time, sound collection is started by a sound collection starting operation and recording of collected sounds is repeated every lapse of time (about 10 seconds) corresponding to a track. However, in this device, sound recording is continued till a sound collection stopping operation is executed. Therefore, it is disadvantageous that unnecessary sound recording is carried out.

In conventional devices, when a sound recording of one track is executed with a frame of image recording, it takes about 10 seconds from the beginning of the photographing to the end of the sound recording. Therefore, when a next shutter release opportunity comes immediately after a first frame of photographing is completed and the corresponding sound recording is started, a user has to wait till the sound recording is completed or has to stop the sound recording by turning OFF the main switch or the like and thereafter start the next photographing. As a result, disadvantageously, the user apt to lose the shutter release opportunity.

After the sound recording is once started, troublesome operations are required for deleting the recorded sounds in such a time that a user fails to record sounds during the sound recording operation or executes photographing without being aware the the program is now in the sound recording mode against the user will.

Further, in conventional devices, usually a magnetic floppy disk adapted to execute image recording and sound recording in interlocked connection with pushing down of a release button. In such a sequential operation, since a spindle motor is being driven during the sound recording operation, a microphone attached to the camera also catches noises of the spindle motor when sounds are inputted through the microphone. Sounds are once stored in a sound memory and thereafter transferred from the sound memory to the floppy disk to be recorded therein. Therefore, rotatively driving of the spindle motor during inputtting sounds into the sound memory causes a waste of electric current.

Further, a device is known in which a start button for starting inputting of sounds is provided in addition to a release button for starting photographing so that the inputting of sounds can be started at a desired timing (for example, see Japanese Laid-Open Patent Publication No. 61-156979). In such a device, sounds can be inputted in the sound memory before starting photographing, but photographing operation and sound inputting operation are not synchronizedly and sequentially executed in relation to each other.

Further, devices are proposed in which a sound recording mode in which sound recording is executed and a mode in which sound recording is not executed are selectively changed over and images are continuously recorded, that is, so-called a continuous photographing mode being able to be set. However, when a sound recording mode and a continuous photographing mode are set at the same time, the operations photographing-→sound recording→ photographing→sound recording are repeated. With these repeated operations, recorded images are intermitted with time intervals of about 10 seconds and become unnatural, thereby failing in obtaining a continuous photographing function.

At a low brightness, back light or the like in the photographing scene, a flashlight mounted on the camera is emitted, and the flashlight is charged by a battery of the camera immediately after the photographing. As a result, the voltage of the battery is temporarily lowered during the charging operation, then, disadvantageously, it is possible that electronic circuits such as a sound inputting circuit are erroneously operated at the time of recording signals. And such a kind of charging circuit has an oscillating circuit provided with a transistor or the like. Therefore, when sound recording operation is executed during the charging operation, oscillating sounds of a boosting transformer are sometimes inputted.

Further, in a camera having a flashlight thereinside or mounted on the outside thereof, it is known that when an uncharged state of the flashlight is detected in spite of the necessity thereof, a release lock is set in order to prevent photographing with underexposure. While, in a camera having a continuous photographing function, when a release lock is set in the continuous photographing operation because the flashlight is uncharged, and then the photographing opertion is started again after completion of the charging, the continuous photographing operation is intermitted for a time required for the charging. As a result, the time intervals of the continuous photographing operation because irregularly each other.

SUMMARY OF THE INVENTION

The present invention relates to a camera for recording still images in a medium and particularly to a camera having a function of recording sounds as well as images. Various kinds of cameras having a function of recording sounds as well as images have been proposed in the field of still video cameras. In recording sounds as well as images, attention should be paid to a fact that the time required for recording sounds is longer than that required for recording still images. Therefore, ideas are necessary in this respect in order to obtain a camera by which a user can adequately record sounds and images.

An object of the present invention is to provide, with giving consideration to the abovementioned fact, a camera by which a user can adequately record sounds and images.

Another object of the present invention is to provide a camera in which the timings of recording sounds and recording images are automatically adequately changed over in correspondence with a self mode and a usual photographing mode respectively, so that photographing can be achieved in the same timb both in the self mode and the usual photographing mode without any laborious operation.

A further object of the present invention is to provide a camera in which, when a user fails to record sounds in the recording operation, only the sound recording can be executed again from the beginning without giving any change to the recorded images.

A further object of the present invention is to provide a camera in which when an instruction to elongate the recording time is given, the recording time can be elogated by a predetermined time without making any operation for stopping the sound recording.

A further object of the present invention is to provide a camera in which even in the sound recording operation, sounds up to that time can be instantly recorded at need and then immediately the following photographing operation can be started, whereby shutter release opportunities can be obtained.

A further object of the present invention is to provide a camera in which, when sound recording is not necessary or when failure in sound recording is noticed after the recording operation is started and therefore, the sounds recorded theretofore can be deleted and the following photographing operation can be immediately started only by a simple operation.

A further object of the present invention is to provide a camera in which a driving means for driving a floppy disk is stopped during inputting the sounds so that the necessary amount of electric current can be decreased and at the same time noises of the driving means are prevented from being inputted.

A further object of the present invention is to provide a camera in which when a sound recording mode and a continuous photographing mode are set at the same time, sound recording is executed during continuous photographing, whereby the ability of continuous photographing of the camera can be raised.

A further object of the present invention is to provide a camera in which charging a flashlight with electricity is forbidden at least during sound recording, so that a sound inputting circuit and the like are prevented from being erroneously operated because of lowering the voltage of a power source.

A further object of the present invention is to provide a camera in which when during continuous photographing, a release is locked because of uncharging of a flashlight, the program can go out of the continuous photographing sequence, whereby the continuous photographing time intervals can be kept regularly through the whole continuous photographing operation.

BRIEF EXPLANATION OF THE DRAWINGS

FIG. 2, including

FIG. 3, including

FIG. 4, including

FIG. 6, including

FIG. 8, including

DETAILED DESCRIPTION OF THE PREFERRED EMBODIMENTS OF THE INVENTION

Figure 1:
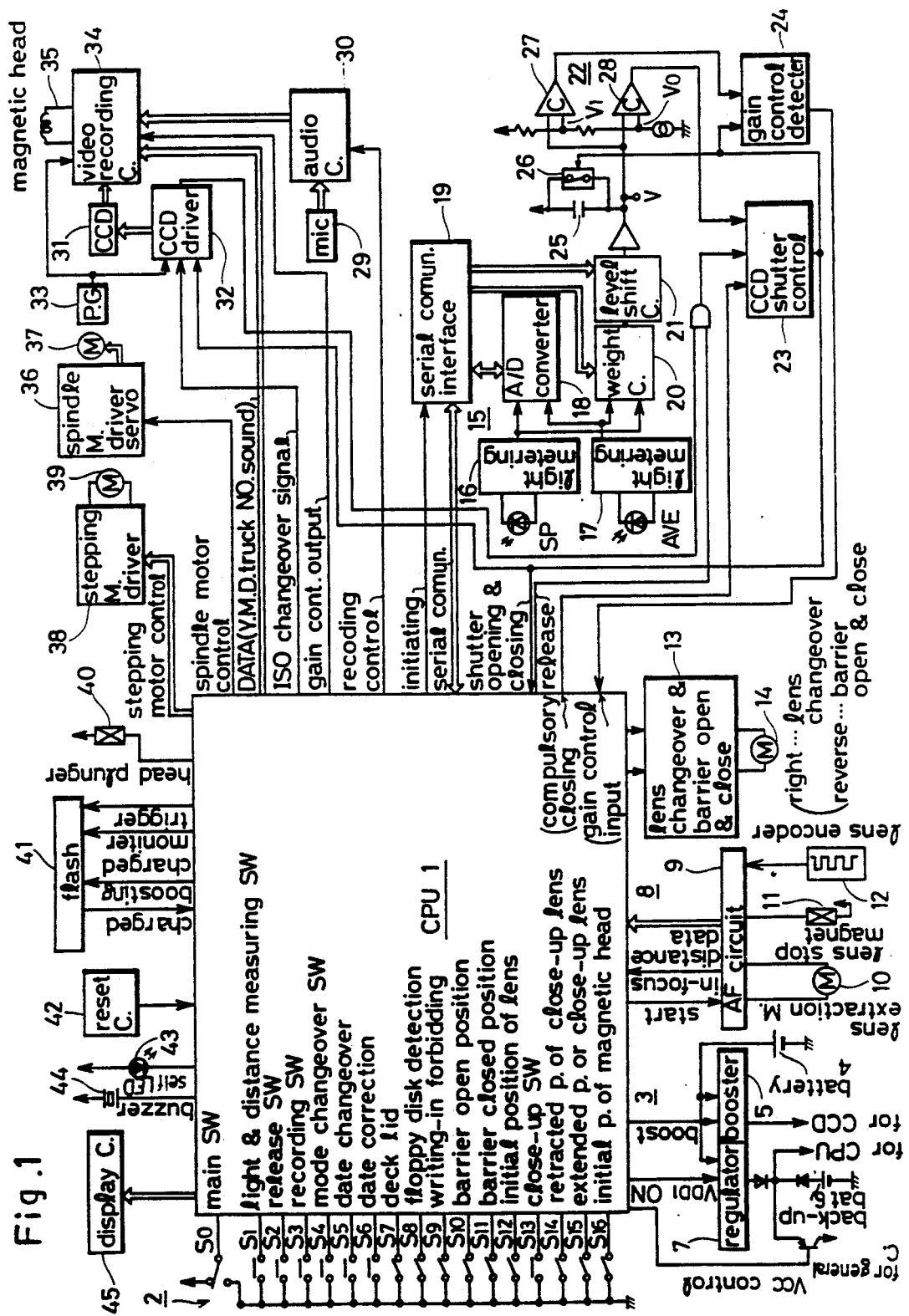
FIG. 1 is a block diagram of a still video camera of an embodiment of the present invention.

FIG. 1 is a block diagram showing the structure of one embodiment of a still video camera on which a sound recorder according to the present invention is mounted.

In FIG. 1, the still video camera comprises a central processing unit (hereinafter referred to as CPU) 1, a group of various kinds of switches 2 through which order informations are inputted to the CPU 1, a power source circuit section 3 and the like. The power source circuit section 3 comprises a main battery 4, a boosting circuit 5 for obtaining a power source for a CCD which will be described later, a back up battery 6, a regulator 7 for obtaining a power source for the CPU 1 and general circuits and the like.

An automatic focusing (AF) circuit 8 comprises an AF circuit 9 for outputting in-focus data and distance data to the CPU 1, a motor 10 for shifting a lens for focusing, a magnet 11 for stopping the lens and an encoder 12 for detecting the lens position. The circuit 13 is operated by a signal outputted from the CPU 1 and drives a motor 14 for changing over a lens and opening and closing a barrier. The motor 14 when rotating in the right direction successively changes over the lens between a standard and a close-up positions, while the motor 14 when rotating in the reverse direction opens and closes the barrier provided in front of the lens and functioning as a plate for shielding a light passage.

An automatic exposure (AE) circuit section 15 comprises the following circuits 16 to 21 and the like. A spot light metering circuit 16 receives, as an input signal, a signal detected by a light metering element SP which meters the brightness of an object positioned in a central spot of a photographing scene. A light metering circuit 17 receives, as an input signal, a signal detected by a light metering element AVE which meters the brightness of an object in the peripheral position of the photographing scene. An A/D converting circuit 18 converts these detected analogue data to digital ones. A serial communication interface 19 receives the A-D converted data and makes a serial communication with the CPU 1. In order to obtain a correct exposure, a weighting circuit 20 gives various weights to the abovementioned detected data respectively as mentioned below according to instructions from the CPU 1 inputted through the interface 19. A level shifting circuit 21 shifts the level of the signal according to an output of the weighting circuit 20 and an instruction outputted from the CPU 1 through the interface 19.

A circuit section 22 controls the timing of practical closing of a CCD shutter based on the output from the AE circuit section 15. The circuit section 22 comprises a capacitor 25 for measuring time, a switch 26 which opens at the timing of opening the CCD shutter and releases the short-circuited state of the capacitor 25, comparators 27, 28 and the like. The comparators 27, 28 compares the potential V at the constant point between the capacitor 25 and the output portion of the level shifting circuit 21 with reference potentials V1, V0. A control circuit 23 outputs signals indicating the opening and closing of the shutter to the CPU 1 and the CCD driver 32. The control circuit 23 opens the CCD shutter according to a release signal for photographing and a pulse signal from the CCD driver 32, and closes the same when a predetermined exposure is obtained by an output from the comparator in the circuit section 22 or a compulsorily closing signal from the CPU 1.

A gain control detecting circuit 24 inputs a signal which electrically controls the gain of a video image recording signal when it is detected that a predetermined exposure (an exposure amount smaller by a predetermined amount than the correct exposure) is not obtained by making use of an output of the comparator 27 and a closing signal from the shutter control circuit 23 even if it exceeds the limit time for preventing the camera shake and at other times.

Further, the camera comprises a microphone 29 for recording, and an audio circuit 30 which is operated by a recording control signal from the CPU 1. The output of the audio circuit 30 is applied to a video recording circuit 34 which will be described later. A CCD image sensor (hereinafter referred to only as CCD) 31 is one of solid image photographing elements which converts optical image data to electric data. A driver 32 for driving the CCD 31 operates according to an output of the CCD shutter control circuit 23, an ISO sensitivity changeover signal, an synchronization signal PG outputted in synchronism with the rotation of a floppy disk and the like.

A video recording circuit 34 drives a magnetic head 35 and magnetically records images and sounds in a floppy disk. The video recording circuit 34 operates according to date data signal (year, month, date, track No. etc.) displayed at the same time with images on a display, a gain control output, and the synchronization signal PG, in addition to an image signal from the CCD 31 and an audio signal from the audio circuit 30.

A spindle motor driver 36 drives a spindle motor 37 according to an instruction from CPU 1, thereby rotating the floppy disk at a constant speed.

A stepping motor driver 38 drives a stepping motor 39 according to an instruction from CPU 1, thereby moving the abovementioned magnetic head 35. By this stepping motor 39, the magnetic head 35 is controlled to move to a predetermined track position of the floppy disk. A plunger 40 sets the magnetic head at a predetermined position at the time of recording (i.e. writing-in).

An electronic flushing device 41 for emitting a flashlight when exposure amount in photographing is unsatisfactory and the like has in the inside thereof a charge circuit for emitting a light and a boosting circuit, starts a boosting operation according to a boosting signal from the CPU 1, and outputs a signal indicating the completion of charging to the CPU 1 when charging is completed according to a signal monitoring the completion of charging outputted form the CPU 1. Further, the flushing device 41 emits a flashlight according to a light emission triggering signal outputted from CPU 1. A reset circuit 42 prevents occurrence of extraordinary operation when the voltage of the power source is lowered. When a mode is set in photographing in which the opening of the CCD shutter is carried out by a self timer, a LED 43 indicates the same by turning on and off a light. When a deck lid for a floppy disk chamber is still opened and other cases, a buzzer 44 rings to warn a user of the fact. A display section 45 is operated according to an output from the CPU 1 so as to display various kinds of camera data, modes and the like by a LCD or other means.

The components of the abovementioned group of switches 2 will now be described in the following. A main switch S0 is used for starting the operation of the camera. A switch S1 is used for metering the light amount and measuring the distance before photographing. A release switch S2 is used for carrying out photographing operation. A sound recording switch S3 is used for selecting one mode in which sound recording is executed or another mode in which sound recording is not executed. A mode changeover switch S4 changes over kinds of modes consisting of a single photographing mode (S, this being a standard mode) in which only a single picture is photographed, a continuous photographing mode (C) in which a plurality of pictures are continuously photographed and a self mode (SELF) in which a self timer is used in photographing. A switch S5 is a switch for changing over date data. A switch S6 is used for correct the data data. A switch S7 is a switch for detecting whether the deck lid is in the opened state or in the closed state. A switch S8 is for detecting the insertion of the floppy disk. A switch S9 is for detecting whether there is a claw for forbidding writing in the floppy disk or not. Switches S10, S11 are for detecting the opening position and the closing position of the abovementioned barrier, respectively. A switch S12 is for detecting the starting position of the lens. A switch S13 is for changing over lenses so as to put the lens in a close-up state in taking a close-up picture. Switches S14, S15 are for detecting the position of putting in a close-up lens (the close-up state) and the position of putting out the close-up lens (the standard state) respectively.

The CPU 1 further comprises arrangements having various kinds of functions such as a self timer means and a sequence control means which will be described later. As a result, data are set and inputted by a user through the recording switch S3, the mode changeover switch S4 and the like before photographing, and stored in a memory in the CPU 1. The CPU 1 executes predetermined programmed operations based on the data stored in CPU 1 to carry out camera operations such as video recording and sound recording.

Especially in an embodiment of the present invention, when SELF mode is selected and set in the mode changeover switch S4, sound recording is executed during self timer counting before photographing. On the other hand, when SELF mode is not selected, the CPU 1 automatically changes over the sequences so that sound recording is executed after completion of photographing.

Now, operations of the camera according to the present invention will be described with reference to flow charts shown in FIGS. 2 to 7.

Figure 2A:
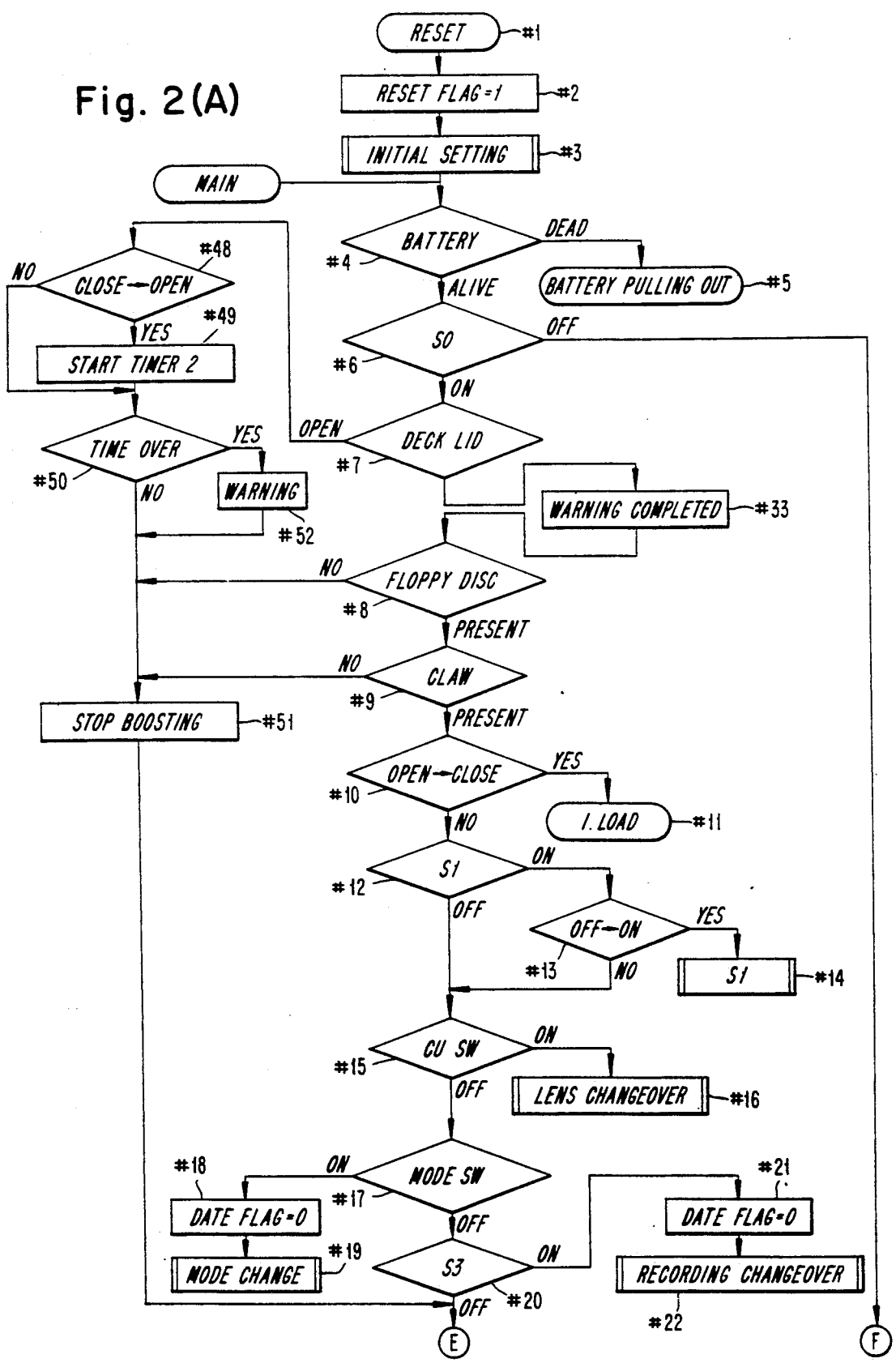
FIGS. 2(A) and 2(B), is a main flow chart showing operation of the camera.
Figure 2B:
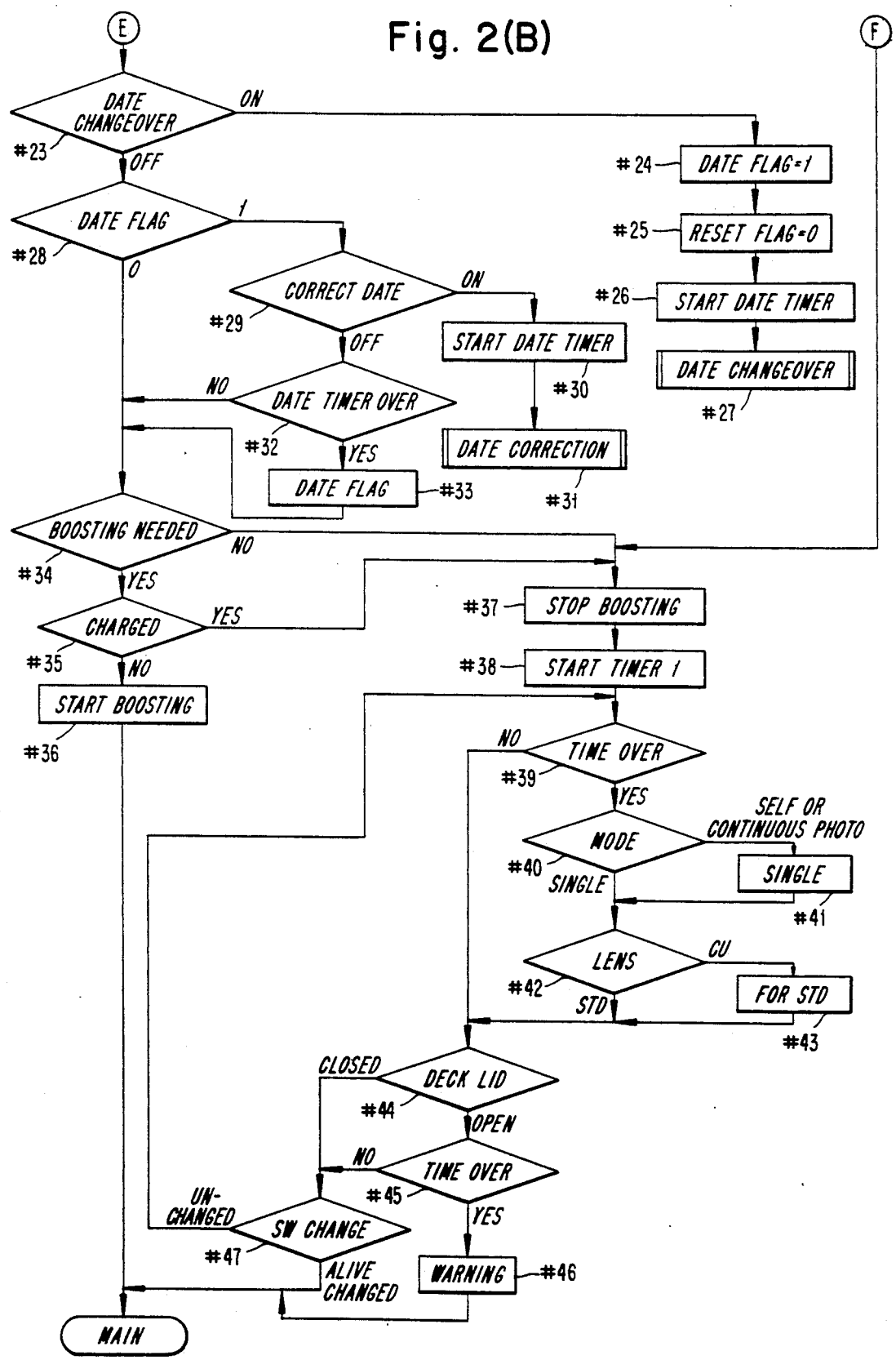

FIG. 2 shows a main flow chart. In this figure, when a power is supplied to the CPU 1, the CPU 1 is reset (step #1). A reset flag is set at 1 (step #2), flags and the RAM being set in the initial state, the lens and the magnetic head 35 being set at the initial positions, thereby executing the initial settings (step #3). If the reset flag remains at 1, it means that the date has not been corrected as described later, and such date data cannot be recorded in the floppy disk. Therefore, in such a case, a warning by turning on and off a part of LCD or the like is given to a user. This is because of the following reasons. In a still video camera and the like having a function of recording date data (time data) such as year, month, date etc., on a recording medium, a time measuring means such as a timer for obtaining date data and a battery as a power source for the time measuring means are provided. When the battery is dead and replaced by a new one, the time data according to the time measuring means is reset and a wrong time data is displayed. If there is provided a back-up battery and with in a predetermined time, such a trouble is not caused. However, when it has taken much time to renew the battery, the data are also reset. If the user finds that the time data are wrong and resets a correct time data, it does not matter. However, if the user takes a picture without aware of the wrong time data, the time data different from the practical photographing time are printed on the picture. Therefore, in this embodiment of the present invention, when, in a camera in which date data of photographing time can be recorded, a means for recording to date data is reset, recording of the date data is forbidden. Then, the battery is checked (step #4) and when the battery is dead, a routine without using a battery is executed (step #5) and when the battery is alive, the state of the main switch S0 is checked (step #6).

When the main switch S0 is in ON state, the opening or closing state of the deck lid, presence or absence of the floppy disk, presence or absence of claw for forbidding recording, and whether the deck lid is in the state, immediately after changed over from OPENED to CLOSED are checked (step #7 to 10). When the deck lid is immediately after being closed, the head of unrecorded track on the floppy disk is searched in a routine of initial road, and the magnetic head 35 is moved to that position (step #11).

Thereafter, when the answer of the judgement at step #10 turns NO, then the state of the light metering and distance measuring switch S1 is checked (step #12). When the switch S1 is turned ON from OFF, S1 sequence (shown in FIGS. 3 and 4) including light metering, distance measuring, exposure and various kinds of steps subsequent thereto is executed (step #13 and #14). When the switch S2 is turned OFF or kept ON since before, S1 sequence is not executed but the close-up switch S13 of the lens is checked (step #15). When the switch S13 is turned ON, a routine for changing over the lens is executed (step #16).

Then, the state of the mode changeover switch S14 is checked (step #17), and when the mode changeover switch S14 is ON, the data flage is set "0". When it is in data changeover correcting mode, the program goes out of the data changeover correcting mode (step #18), and a routine for changing mode is executed (step #19). By this mode changing, any one of the single, continuous photographing, and self mode is stored as abovementioned. Then, the state of the recording switch S3 is checked (step #20). When the recording switch S3 is ON, the data flag is also set "0", and when it is in data changeover correcting mode, the program goes out of this mode (step #21), and a routine for changing over recording is executed (step #22).

The abovementioned close-up switch S13, the changeover switch S4, the recording switch S3, and the like are turned into different states respectively every time they are pressed (namely, turned ON), and by pressing these switches the same number of times with that of the existing states, they return to the initial states respectively.

After that, the state of the date changeover switch S5 is checked (step #23), and when the switch S5 is turned ON, the date flag is set "1" thereby setting the date changeover correcting mode (step #24). Then, the reset flag is set "0" to afford to record the date (step #25). After a predetermined time passes, a date timer for getting out of the changeover correcting mode is started (step #26), and a date changeover routine is executed (step #27). Then, the date flag is checked (step #28), and when the date flag is "1" and the date correcting switch S6 is turned ON, the abovementioned date timer is newly started (steps #29, #30) and a routine for correcting the date is executed (step #31). When the date correcting switch S6 is OFF and a predetermined time of the date timer passes (YES at step #32), the date flag is set "0" (step #33), and the program goes out of the date changeover correcting mode. Further, the program can get out of the date changeover correcting mode by turning ON the light metering and distance measuring switch S1, as described later in S1 sequence. This is from the following reasons. In a camera such as a still video camera having a function of recording date data, a date correcting mode and a usual time measuring mode are provided and after the date is corrected, the camera is required to return to the usual time measuring mode. Therefore, when photographing is executed without returning the date correcting mode to the time measuring mode, sometimes date is not recorded. Accordingly, in this embodiment of the present invention, in a camera having a function of recording the date data of the photographing time, even if the program is still in the date correcting mode, it can be automatically changed over to the mode capable of recording the date by the release operation in photographing.

Then, it is detected whether boosting of the charge circuit of the flashlight 4 is necessary or not (step #34). When the boosting is necessary, it is detected whether the charging is completed or not (step #35). When the charging is not completed, the boosting is started (step #36), and the program returns to the abovementioned step #4. Further, when the main switch S0 is OFF at step #6 and boosting is not necessary at step #34 or charging is completed at step #35, the boosting is stopped (step #37) and a first timer by which out-of-operation time is measured is started (step #38). Before predetermined times passes (NO at step #39), it is detected whether the deck lid is opened or closed (step #44). When the deck lid is closed or when it is opened but a predetermined time set in a belowmentioned second timer has not passed (NO at step #45), it is detected whether the states of the switches S0, S1, S2, S3, S4, S5 and S6 and the deck lid change or not (step #47). When there is some change, the program returns to the abovementioned step #4, and when there is no change, it returns to step #39.

When the predetermined time set in the first timer has passed at step #39, the mode is checked (step #40). When it is the self mode or the continuous photographing mode, it is changed to the standard single mode (step #41), and further the state of lens is checked (step #42). When the lens is in the close-up mode, it is changed to the standard mode (step #43), and the program advancing to the abovementioned step #44. This is executed from the following reasons. In some of cameras capable of changing a focal length of a taking lens thereof, the appearance of the camera does not change even if the focal length changes. Such type of cameras are disadvantages in that, because of no change in appearance, when a user forgets the focal length a long time after the change of the focal length, it takes much time for him to know the present focal length. Accordingly, in this embodiment of the present invention, the lens is adapted to return to a predetermined position when the camera is left unoperated for a predetermined time, whereby a user can easily know the present focal length of the lens.

Further, when a predetermined time set in the second timer has passed at step #45, the buzzer 44 gives a warning (step #46). As being apparent from this flow chart, when the deck lid is in the open state, no input can be received and only the date correction can be executed.

Further, when the deck lid is in open state at step #7, the program advances to step #48. On the other hand, when the deck lid is in the state immediately after being opened from the closed state, the second timer is started (step #49). Till the predetermined time passes, and when there is no floppy disk at step #8, and when there is no claw (namely, when recording is forbidden) at step #9, boosting is stopped (step #51), and without checking the state of the switch S1 and the like, the program advances to the abovementioned step #23. And when the predetermined time set in the second timer has passed, a warning is given similarly as abovementioned (step #52). When the deck lid is turned into the closed state, the warning is stopped (step #53).

Now an embodiment of the abovementioned S1 sequence at step #14 will be described with reference to FIG. 3. In this embodiment, recording is forbidden during continuous photographing, and recording is executed after continuous photographing, and further, when the self mode is selected, recording is executed during the operation of the self timer.

Figure 3A:
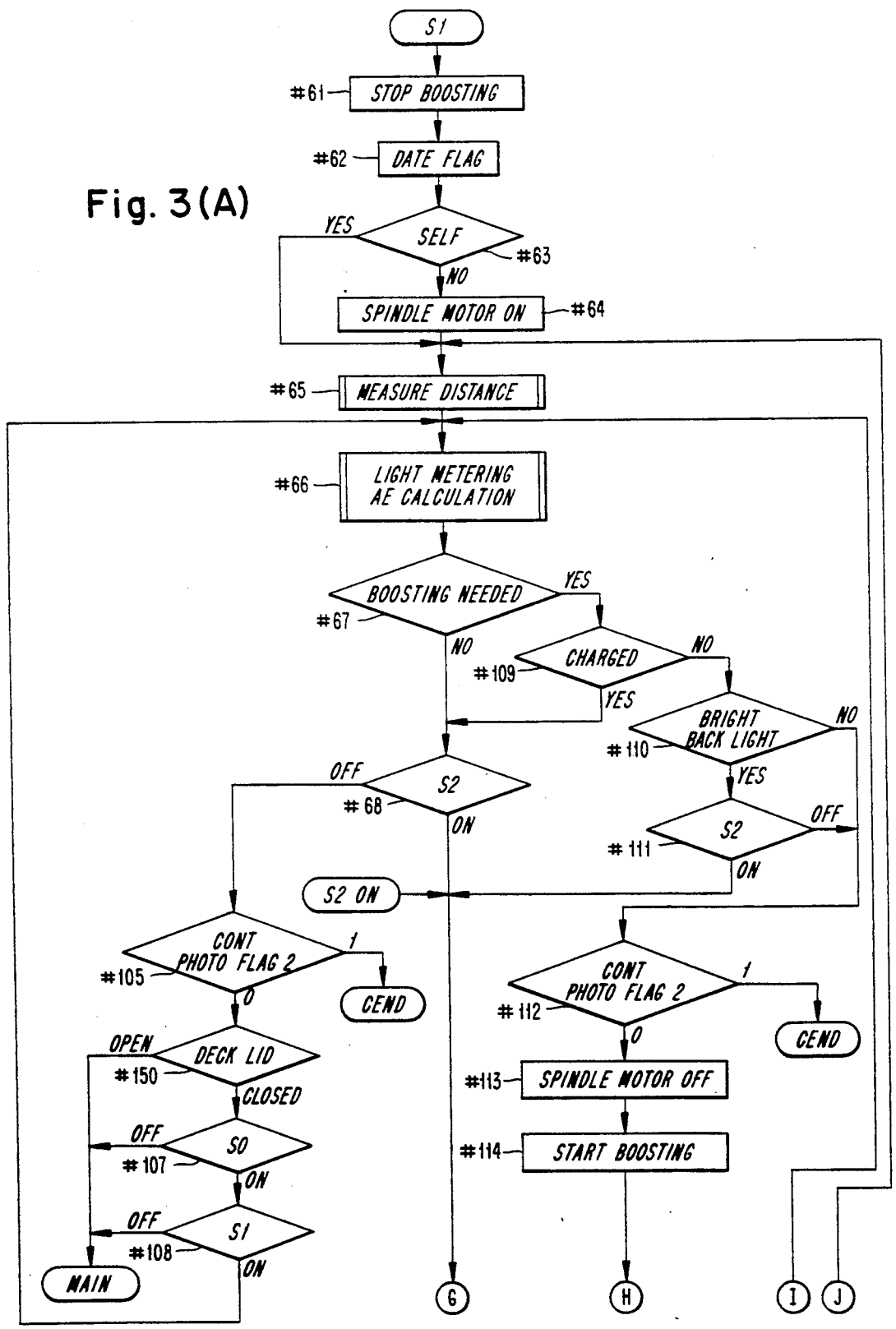
FIGS. 3(A), 3(B), and 3(C), is a flow chart showing an embodiment of a sequence of a switch S1.
Figure 3B:
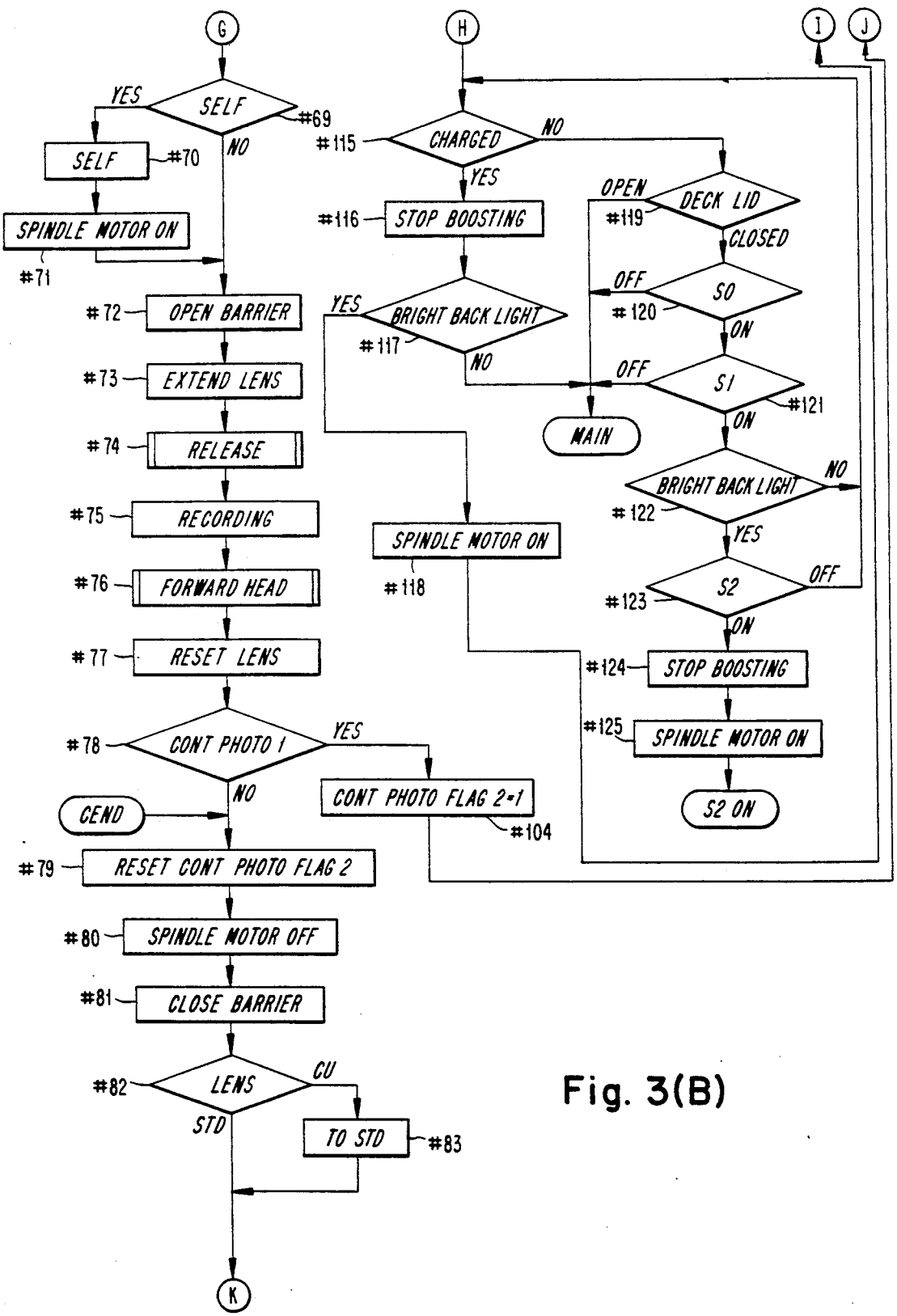
Figure 3C:
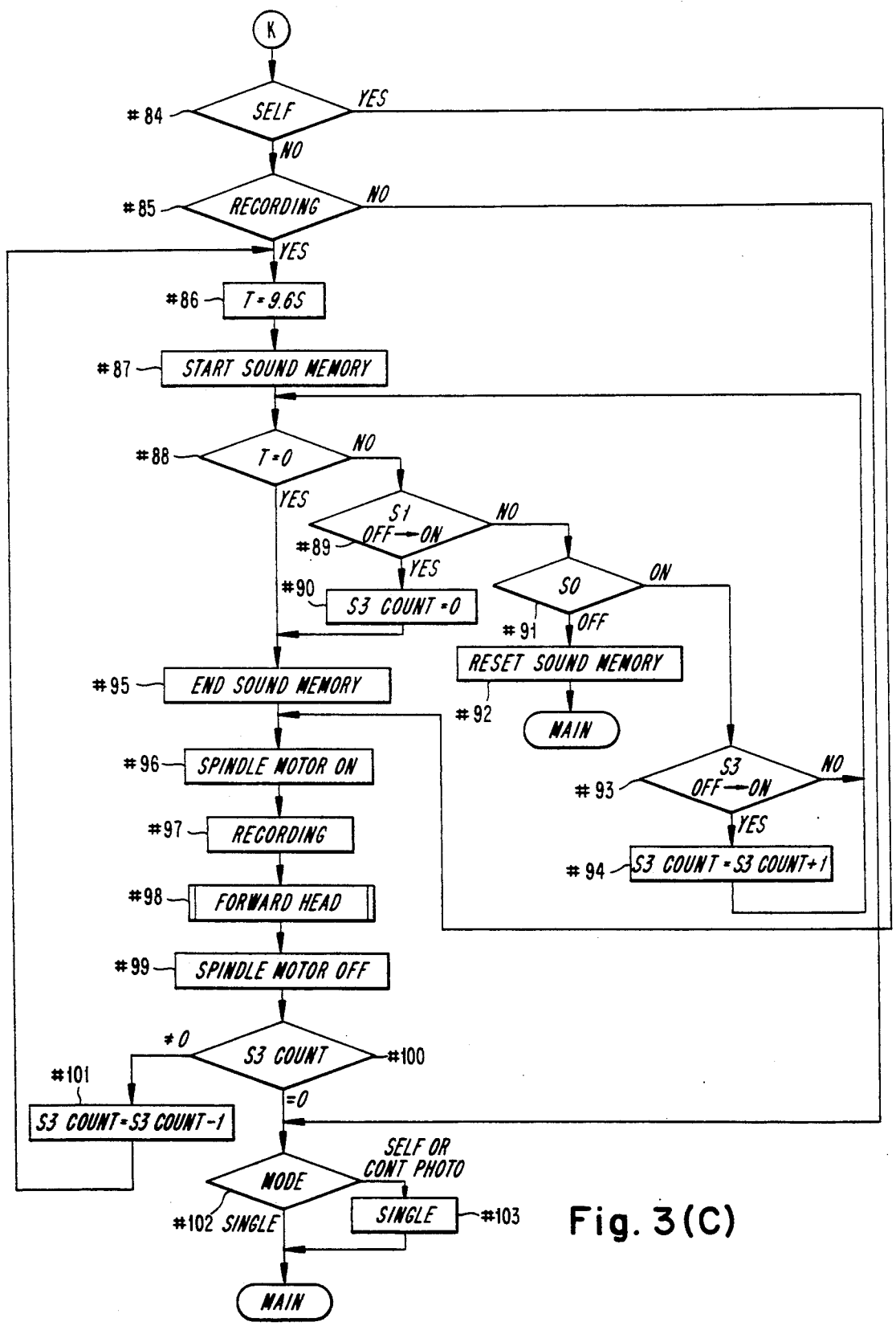
Figure 4A:
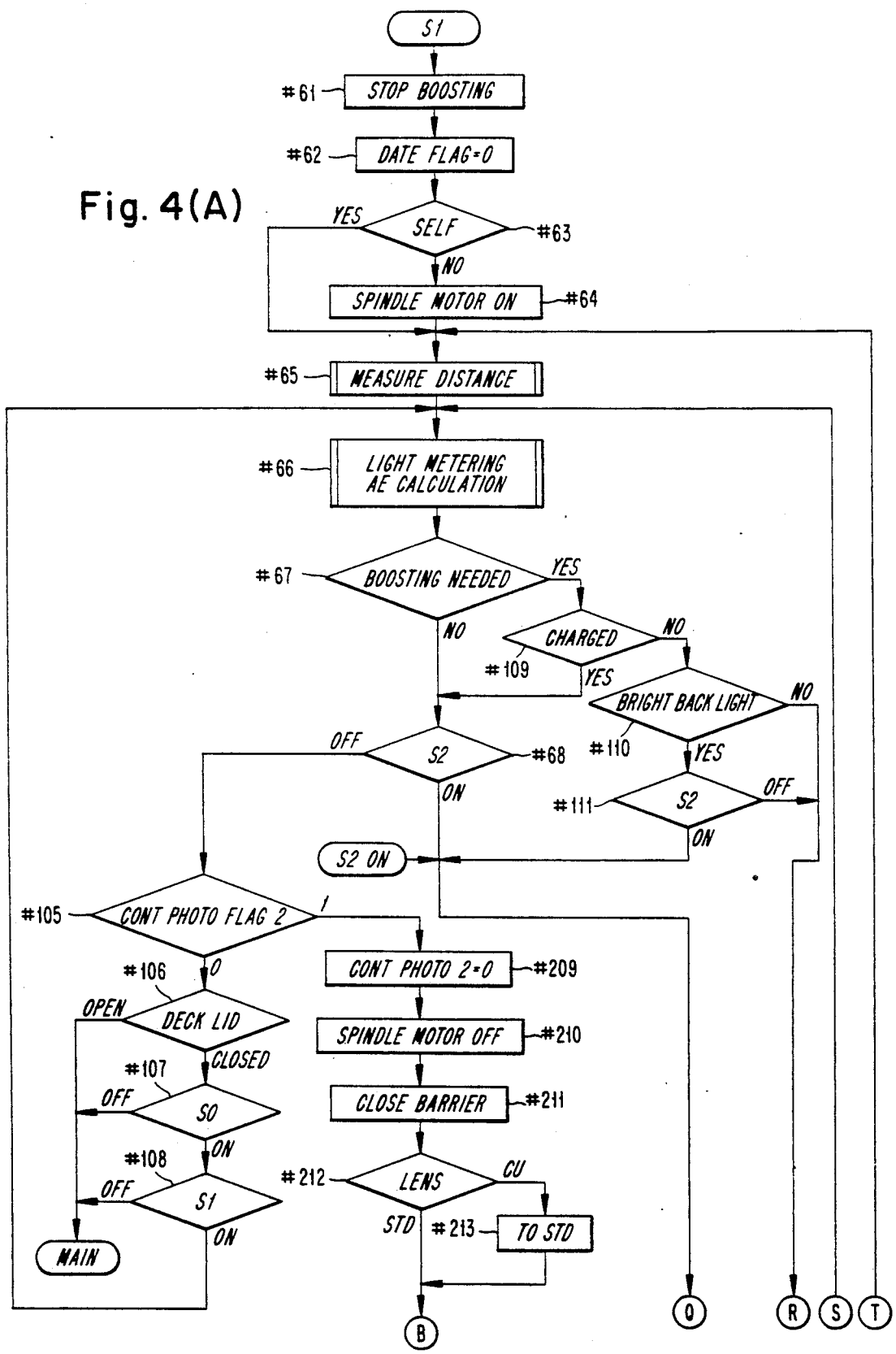
FIGS. 4(A), 4(B), 4(C), and 4(D), is a flow chart showing another embodiment of a sequence of the switch S1.
Figure 4B:
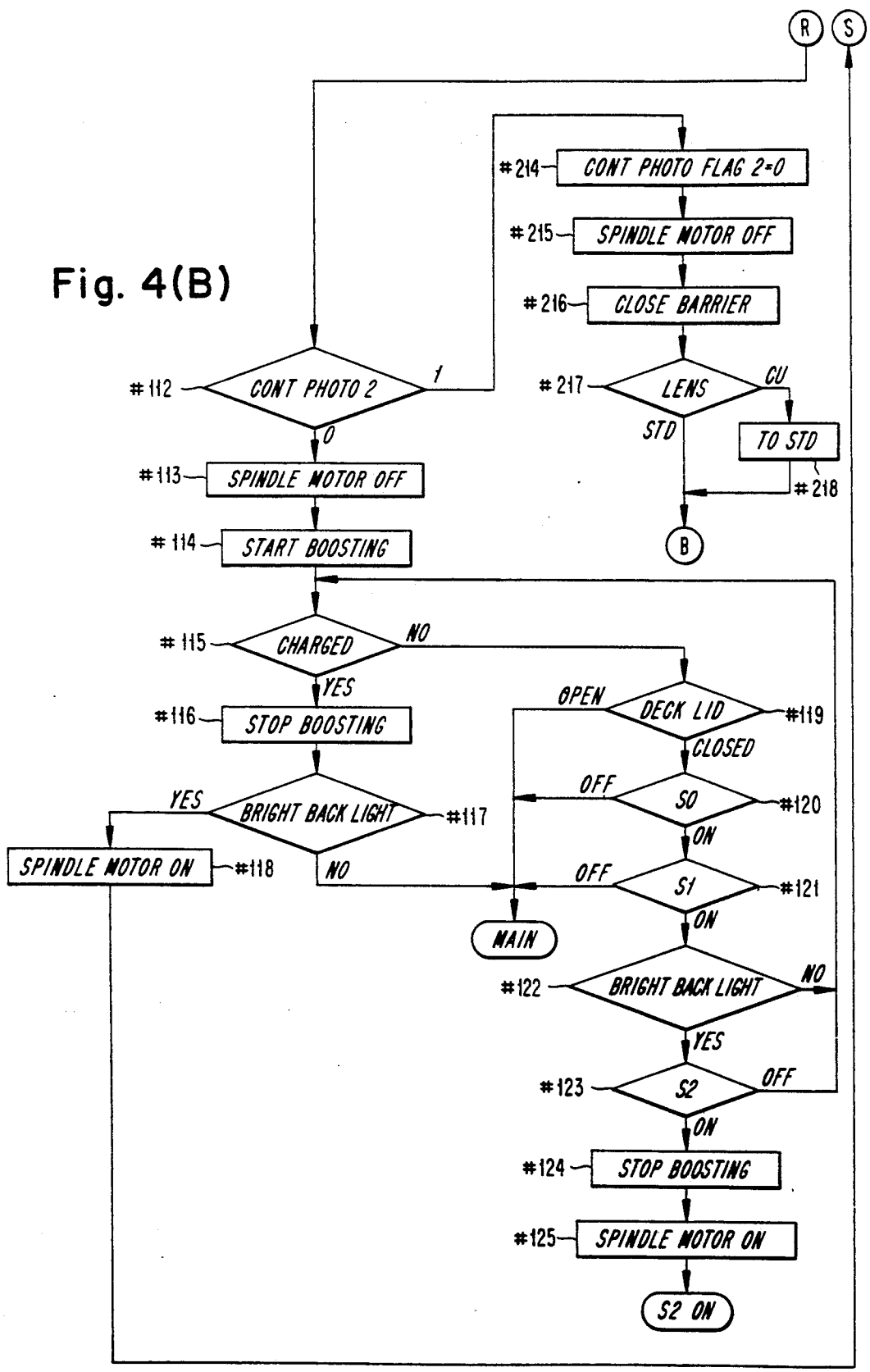
Figure 4C:
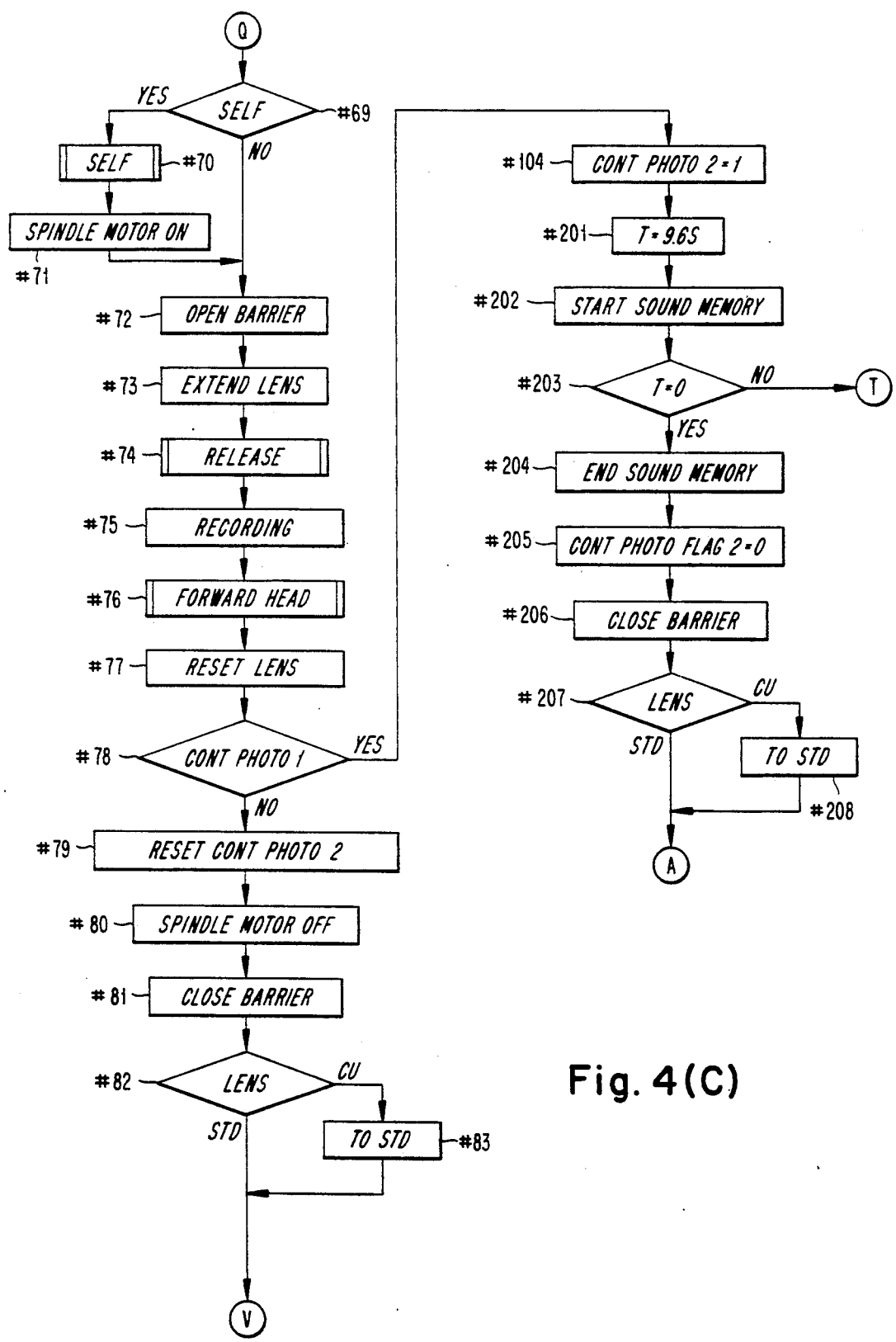
Figure 4D:
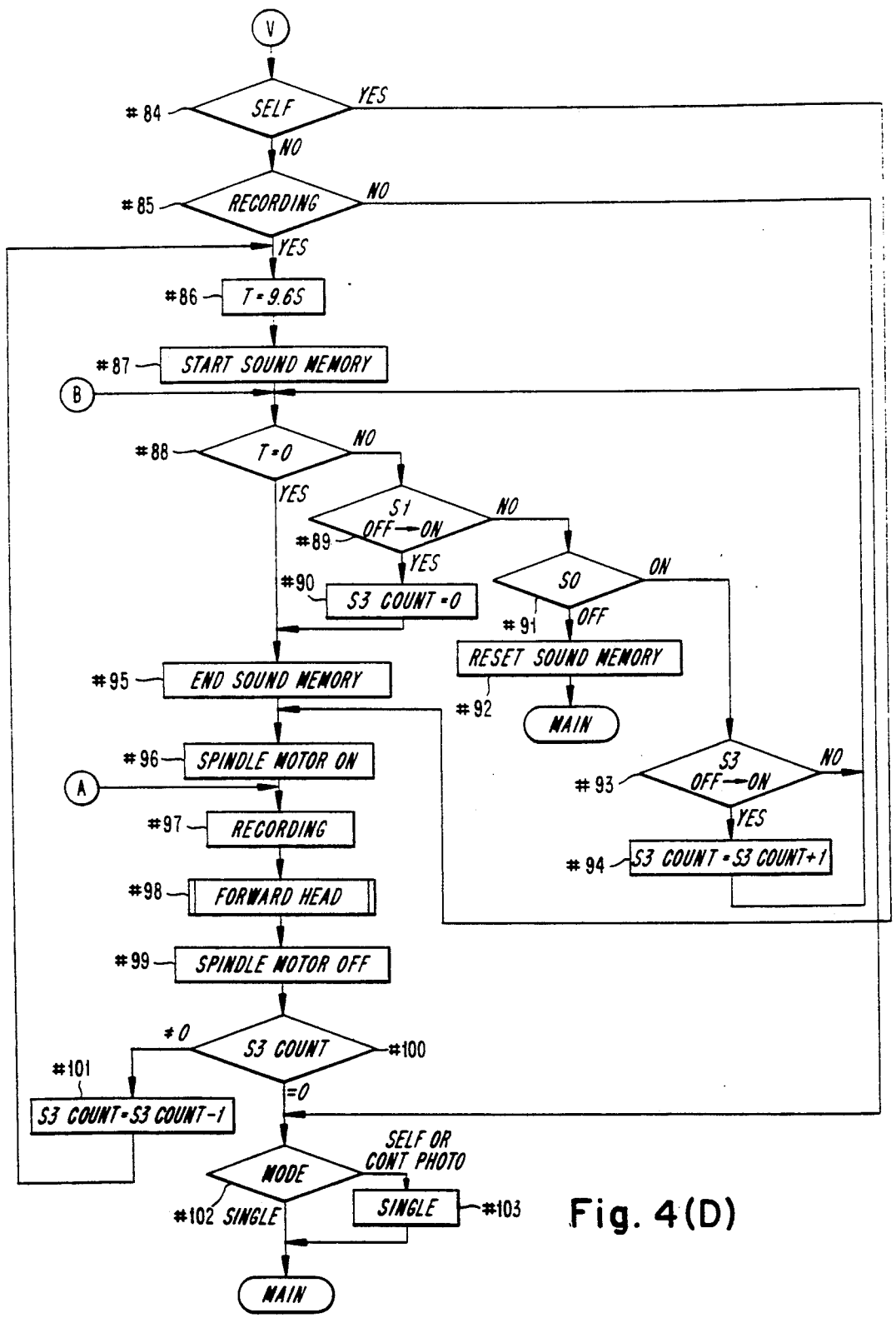

In FIG. 3, firstly boosting is stopped for forbidding charging during video and sound recording (step #61), and the date flag is set "0" (that is, the program goes out of the date changeover correcting mode with the switch S1 being ON) (step #62). Then, it is checked whether the self mode is stored or not (step #63). When it is not the self mode, a spindle motor 37 for driving the floppy disk so as to immediately be ready for recording (step #64). On the other hand, when it is the self mode, the spindle motor 37 is not turned ON during counting by the self timer at this time so as to save electric power.

Then, distance measuring and a light metering and AE calculating routine which is described later are executed (steps #65, #66). After that, it is detected from the calculation whether boosting is needed or not (step #67). When it is not needed, it is waited that the release switch S2 is turned ON (step #68). When the switch S2 is turned ON, it is detected whether the self mode is stored or not (step #69). When it is not the self mode, immediately the barrier is opened, and when it is the self mode, after the belowmentioned self sequency is executed (step #70), and after turning ON the spindle motor 37 (step #71), the barrier is opened (step #72). Then, the lens is shifted to an in-focus position by driving a lens shifting motor 10 (step #73). A release routine which will be described later is executed (step #74), and further, images are recorded in the floppy disk by means of a video recording circuit 34 and the like (step #75). At this recording step, date data such as year, month and day and track number are also recorded. When it is not the self mode, recording is executed after photographing images and so it is not executed at this stage.

After that, a magnetic head 35 is forwarded to the next unrecorded track (step #76), then, the lens being reset (step #77), and it is checked whether the memory data for mode selection is the continuous photographing mode or not (step #78). When it is not the continuous photographing mode, a continuous photographing flag 2 is reset (step #79), the spindle motor 37 being turned off as recording the images are completed (step #80), the barrier being closed (step #81), and the lens is returned to the standard position (steps #82, #83).

Further, when it is not the self mode (NO at step #84), the memory data set by the recording switch S3 is checked (step #85), when it is the recording mode, then the following recording operation is executed. The time T of the timer during which sound is stored in the sound memory is set at 9.6 seconds (step #86), and sound storing in the sound memory is started (step #87). Then, the timer is counted down, and it is detected whether the time T of the timer becomes 0 or not (step #88) and whether the light metering and distance measuring switch S1 turns ON from OFF before the time T becomes 0 (step #89). Here, when a user intends to stop recording in the way, such an intention can be realized by turning OFF the switch S1 and turning ON the same again. Therefore, when the answer is YES at step #89, that is, when the user wishes to stop recording, a S3 count which will be described later is set "0" (step #90) and the sound memory is ended (step #95).

When the answer is NO at step #89, the state of the main switch S0 is checked (step #91), and when the main switch S0 is turned OFF, it is regarded as an intention of the user to stop recording from the beginning and the sound memory is reset (step #92). Then, without recording the sound, the program goes to step #4 of the abovementioned main flow chart shown in FIG. 2. When the main switch S0 is kept ON, then it is checked whether the recording switch S3 is turned ON from OFF (step #93). This is because an intention to execute additional recording for a photographing image can be realized by pressing the recording switch S3. In other words, by pressing the recording switch S3 one time, its counter (hereinafter referred to as S3 count) is incremented by 1 (step #94), and the program returns to step #88. By this increment of S3 count, the program goes through steps #100 and #101 to return to step #86, and then the recording timer is set again whereby additional recordings of the same number with the number of S3 count can be executed, as described later.

The time T of the timer becomes 0, sound storing in the sound memory is ended (step #95). Then the spindle motor 37 is turned ON (step #96) and sound recording is executed (step #97). Here, the track number and the track number in correspondence with the sound are recorded, but date data such as year, month and day are not recorded. Then, the magnetic head is forwarded to the next unrecorded track (step #98), the spindle motor 37 being turned OFF (step at #99), and S3 count is checked (step #100). When S3 count is 0 and when the mode is the self or continuous photographing mode, it is turned to the standard single mode (steps #102 and #130) and thereafter the program returns to step #4 of the main flow chart. Further, when S3 count is not 0 at step #100, S3 count is decremented by 1 (step #101), and the program returns to step #86. In such a manner, additional recording is executed.

When the mode is not the recording mode at step #85, the abovementioned step of recording operation is not executed and the program advances to step #102.

Further, when the continuous photographing mode is set at the abovementioned step #78, the continuous photographing flag 2 is set "1" (step #104), and the program returns to step #65 and the abovementioned routine is treated, whereby continuous photographing is executed. Here, recording is not executed during the continuous photographing.

When the release switch S2 is kept OFF or turned OFF at the abovementioned step #68, the continuous photographing flag 2 is checked. When it is not in continuous photographing, the state of opening and closing of the deck lid, the state of the main switch S0, the state of the light metering and distance measuring switch S1 are checked respectively (steps #106 to #108). When they are closed, ON and ON respectively in this order, the program returns to step #66. When either of them are open, OFF and OFF respectively, the program returns to step #4 of the main flow chart. When the continuous photographing flag 2 is "1" at step #105, it is regarded as the stop of the continuous photographing operation, and the program goes to the abovementioned step #79.

On the other hand, when it is judged that boosting is necessary at step #67, it is detected whether the charging is completed or not (step #109). When the charging is completed, the program advances to the abovementioned step #68. When it is not completed, it is detected whether it is a back light in bright available light (hereinafter referred to as a bright back light) (step #110). When it is a bright back light and at the same time the release switch S2 is turned ON (YES at step #111), the program goes to step #69, but in other cases, the continuous photographing flag is checked to know whether it is in continuous photographing operation or not (step #112). When it is in the continuous photographing operation, so-called uncharged lock (which is caused when it turns dark in the way of the continuous photographing operation) is executed i.e., the continuous photographing operation is stopped, the program going to the abovementioned step #79. When it is not in the continuous photographing operation, the spindle motor 37 is turned OFF so as to save electric power (step #113), and the boosting is started (step #114). After that, it is detected whether the charging is completed (step #115). When the charging is completed, the boosting is stopped (step #116), and it is detected again whether it is a bright back light (step #117). When the answer is YES, the spindle motor 37 is turned ON (step #118), and the program returns to the abovementioned step #66. When the answer is NO, the program returns to step #4 of the main flow chart.

Further, when the charging is not completed at the abovementioned step #115, the states of the deck lid, the main switch S0 and the light metering and distance measuring switch S1 are checked respectively (step #119 to #121). When they are closed, ON and ON respectively in this order, it is checked whether it is a bright back light. When it is a bright back light, the state of the release switch S2 is checked (step #123). When the release switch S2 is ON, the boosting is stopped before the completion of the charging (step #124), the spindle motor 37 is turned ON (step #125) and photographing is executed (the program advances to step #69). Further, when the answer is NO at step #122, that is, it is dark, or when the release switch S2 is OFF at step #123, the program returns to the abovementioned step #115. Further, when either one occurs that the deck lid is open at steps #119 to #121, that the main switch S0 is OFF or the light metering and distance measuring switch S1 is OFF, the program goes out of S1 sequence and goes to step #4 of the main flow chart.

When the self mode is stored and the sequence of this self mode (step #70) is executed, sound recording has been already completed, and therefore the program advances from the abovementioned step #84 immediately to step #96.

S1 sequence shown in FIG. 3 is an embodiment in which sound recording is carried out after the continuous photographing operation (however, when the self timer is being set, sound recording is executed during the self timer counting). Now another embodiment will be described with reference to FIG. 4, in which sound recording is carried out during the continuous photographing operation.

In this embodiment shown in FIG. 4, when the mode is in the continuous photographing mode, the program advances from step #78 to step #104, and after the continuous photographing flag 2 is set "1", sound recording operation is executed in the following manner. Firstly, the time T of the timer is set at 9.6 seconds (step #201), and sound storing is started (step #202), the program returning from step #203 to #65 till the time T becomes 0. By repeating this routine, the continuous photographing and sound recording are executed. When the time T becomes 0, the sound memory is ended (step #204), the continuous photographing flag 2 is set "0" (step #205), the barrier being closed (step #206), the lens being returned to the standard (step #207 and #208), then the program advances, without treating the routine of sound recording and the like, immediately to step #97 where the sound is recorded.

Further, the program advances from the #68 to #105, and when continuous photographing flag 2 is 1 at step #105, it is judged that the continuous photographing operation is stopped. Therefore, the continuous photographing flag 2 is set "0" (step #209), the spindle motor 37 being turned OFF (step #210), the barrier being closed (step #211), the lens being returned to the standard (step #212, #213), and thereafter the program goes to step #88, where sound recording is continued till the time T becomes 0. Further, when the program advances to step #112 because of uncharged lock and the continuous photographing flag 2 is "1", the continuous photographing operation is stopped at step #214 to #218 similarly at the abovementioned steps #209 to #213, and the program goes to step #88.

In this embodiment, additional sound recording after the recording is ended with the lapse of the time of 9.6 seconds cannot be executed, and however, when the continuous photographing operation ends before the time T of 9.6 seconds has passed (by turning OFF of the switch S2 or because of uncharged lock), additional sound recording can be executed. Further, by S1 sequence shown in FIGS. 3 and 4, the barrier is kept open during the continuous photographing operation so as to reduce time lag. Further, the track number of the image in correspondence with the sound in the continuous photographing operation can be put in correspondence with the first track number (namely, the track number of the first scene of the continuous photographing) or with all of the track numbers.

Figure 5:
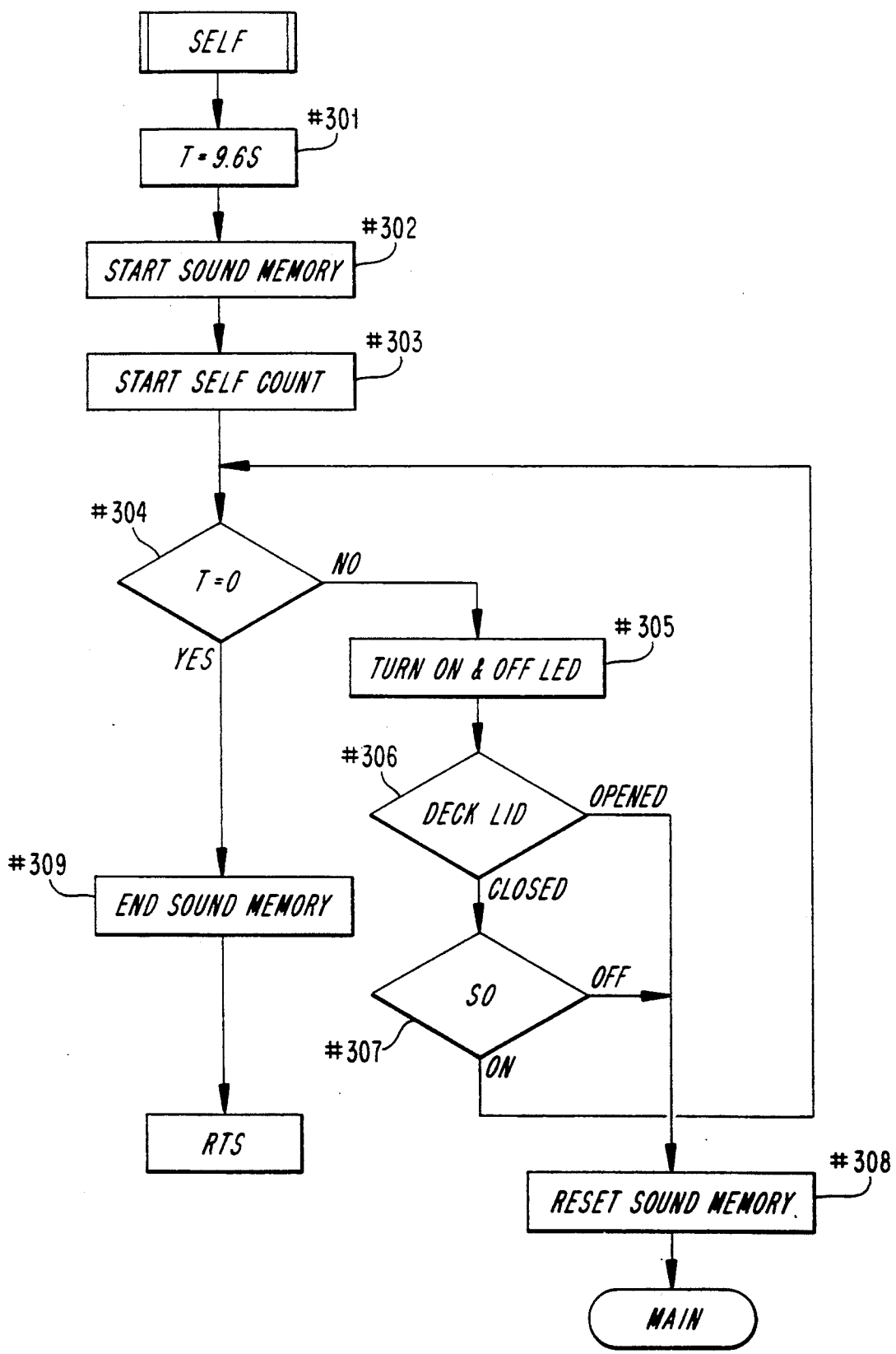
FIG. 5 is a flow chart showing a sequence of a self mode.

Now, a sequence of the self mode at step #70 will be described with reference to FIG. 5.

The time T of the timer is set at 9.6 seconds (step #301), and sound storing and self count are started (steps #302 and #303). During the count of the timer, LED is turned ON and OFF so as to indicate that the self count or the sound recording is now going on (step #305). When the deck lid is opened or the main switch S0 is opened during the sound recording at steps #306 and #308, it is regarded as an intention of stopping the sound recording from the beginning, and the sound memory is reset (step #308), the program returning to the main flow chart. When the sound recording is continued till the timer is counted up (YES at step #304), the sound storing is ended (step #309), the program going to step #71 is S1 sequence.

Recording of the stored sound into the floppy disk in the self mode is executed at step #97 after recording of images (step #75 in FIGS. 3 and 4). Further, LED is turned ON and OFF in self counting so as to indicate that self counting or recording is now going on as abovementioned, and this LED used for the self mode can be also used for indicating that recording is going on in the usual photographing (for example, in the single mode).

Now, another embodiment of S1 sequence of the abovementioned step #14 will be described with reference to FIG. 6. This embodiment is similar to the abovementioned embodiment in that sound recording is forbidden during the continuous photographing operation and executed after the completion of the continuous photographing. However, this embodiment is so modified that after the program goes to S1 sequence, the recorded content can be reset.

Figure 6A:
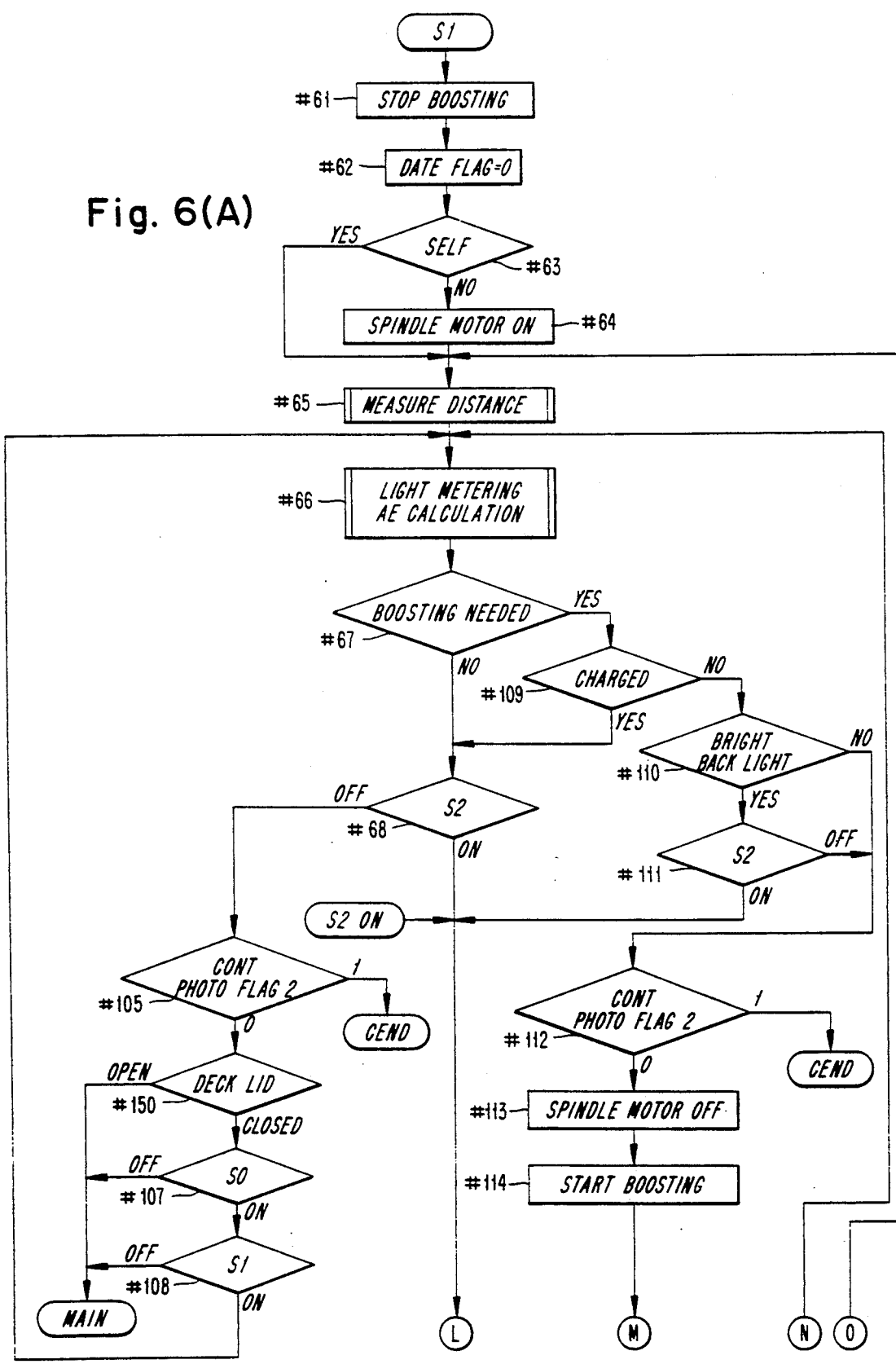
FIGS. 6(A), 6(B), and 6(C), is a flow chart showing a further embodiment of a sequence of the switch S1.
Figure 6B:
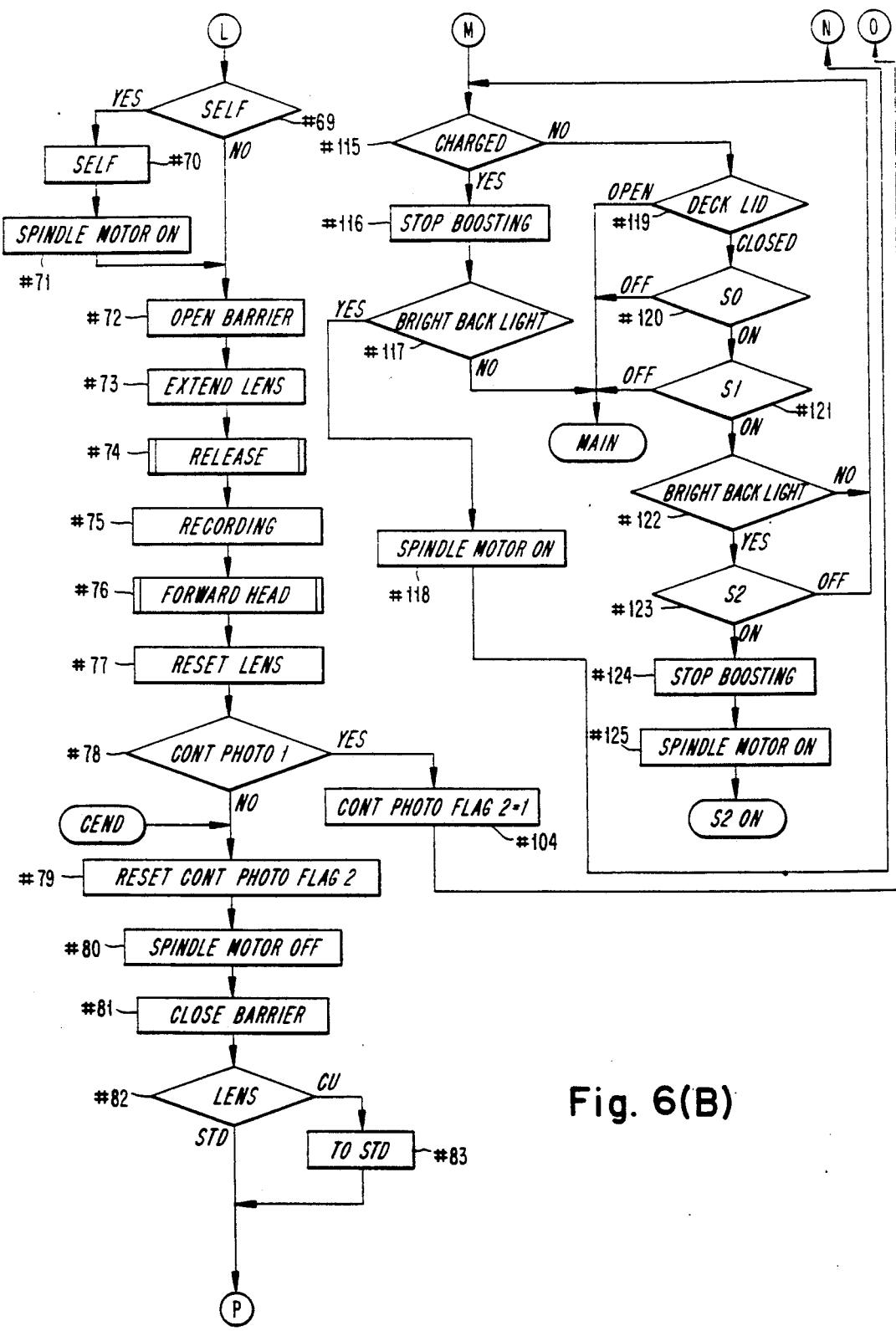
Figure 6C:
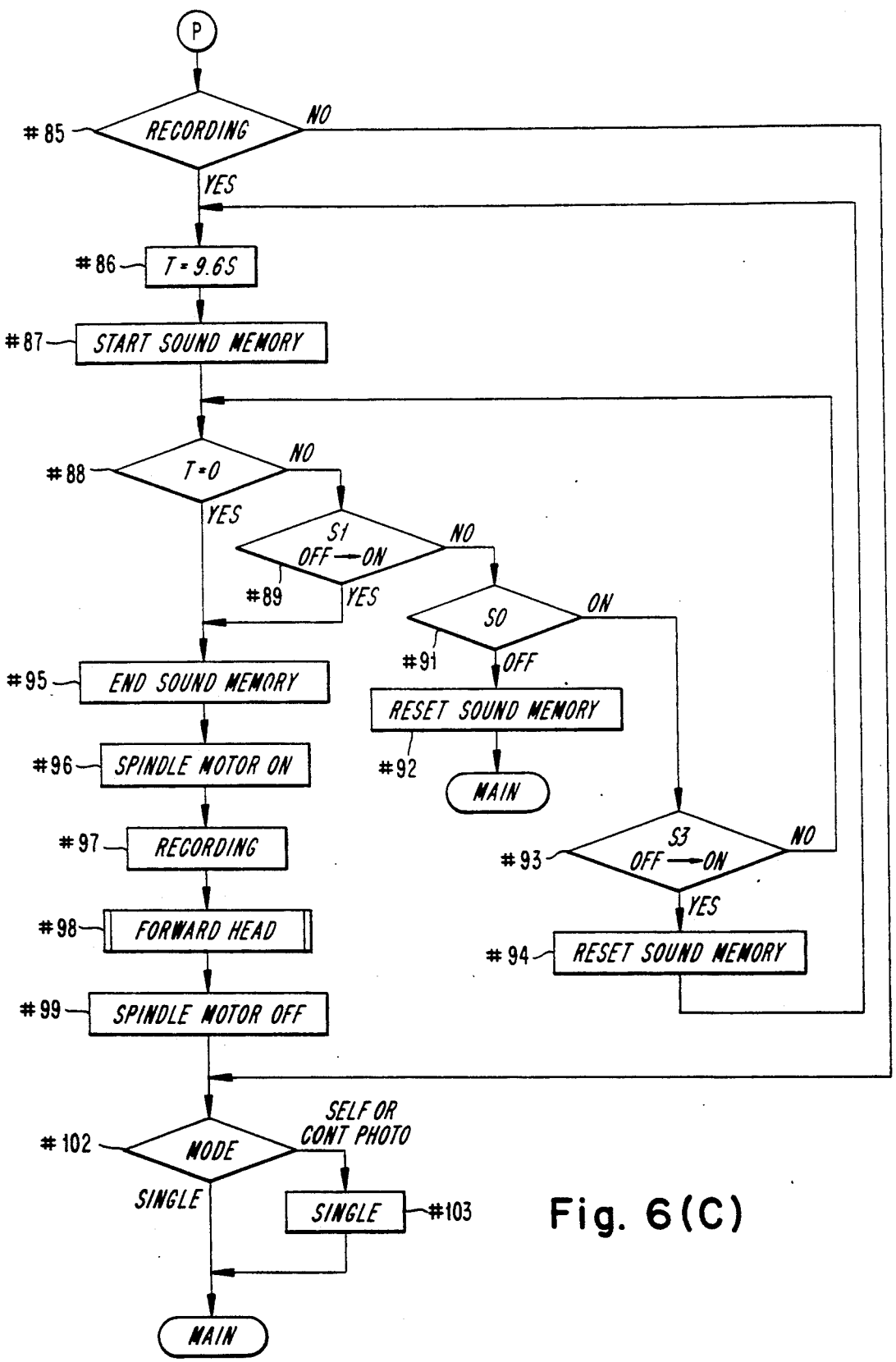

In FIG. 6, the operation of step #61 to #83, step #105 to #108, and step #109 to #125 are the same with corresponding steps in FIG. 3. Hereinafter step #85 to #103 will be described. The memory data set by the recording switch S3 is check (step #85), when it is the recording mode, then the following recording operation is executed. The time T of the timer during which sound is stored in the sound memory is set at 9.6 seconds (step #86), and sound storing in the sound memory is started (step #87). Then, the timer is counted down, and it is detected whether the time T of the timer becomes 0 or not (step #88) and whether the light metering and distance measuring switch S1 turns ON from OFF before the time T becomes 0 (step #89). Here, when a user intends to stop recording in the way, such an intention can be realized by turning OFF the switch S1 and turning ON the same again. Therefore, when the answer is YES at step #89, that is, when the user wishes to stop recording and the sound recording is ended (step #95).

When the answer is NO at step #89, the state of the main switch S0 is checked (step #91), and when the main switch S0 is turned OFF, it is regarded as an intention of the user to stop recording from the beginning and the sound memory is reset (step #92). Then, without recording the sound, the program goes to step #4 of the abovementioned main flow chart shown in FIG. 2. When the main switch S0 is kept ON, then it is checked whether the recording switch S3 is turned ON from OFF (step #93).

Turning ON of the recording switch S3 at this stage means an instruction of delecting the preceding recorded sound and newly recording sound from the beginning. In other words, when the answer is YES at step #93, the sound memory is reset (step #94), the time T of the timer being set again (step #86), whereby sound recording is executed again. In such a manner, only the recorded sound can be changed with keeping the recorded visual content unchanged when a user has failed in recording sound or wishes to record sound over again.

The time T of the timer becomes 0, sound storing in the sound memory is ended (step #95). Then the spindle motor 37 is turned ON (step #96) and sound recording is executed (step #97). Here, the track number and the track number in correspondence with the sound are recorded, but date data such as year, month and day are not recorded. Then, the magnetic head is forwarded to the next unrecorded track (step #98), the spindle motor 37 being turned OFF (step at #99), and when the mode is the self or continuous photographing mode, it is turned to the standard single mode (steps #102 and #103) and thereafter the program returns to step #4 of the main flow chart.

Figure 7:
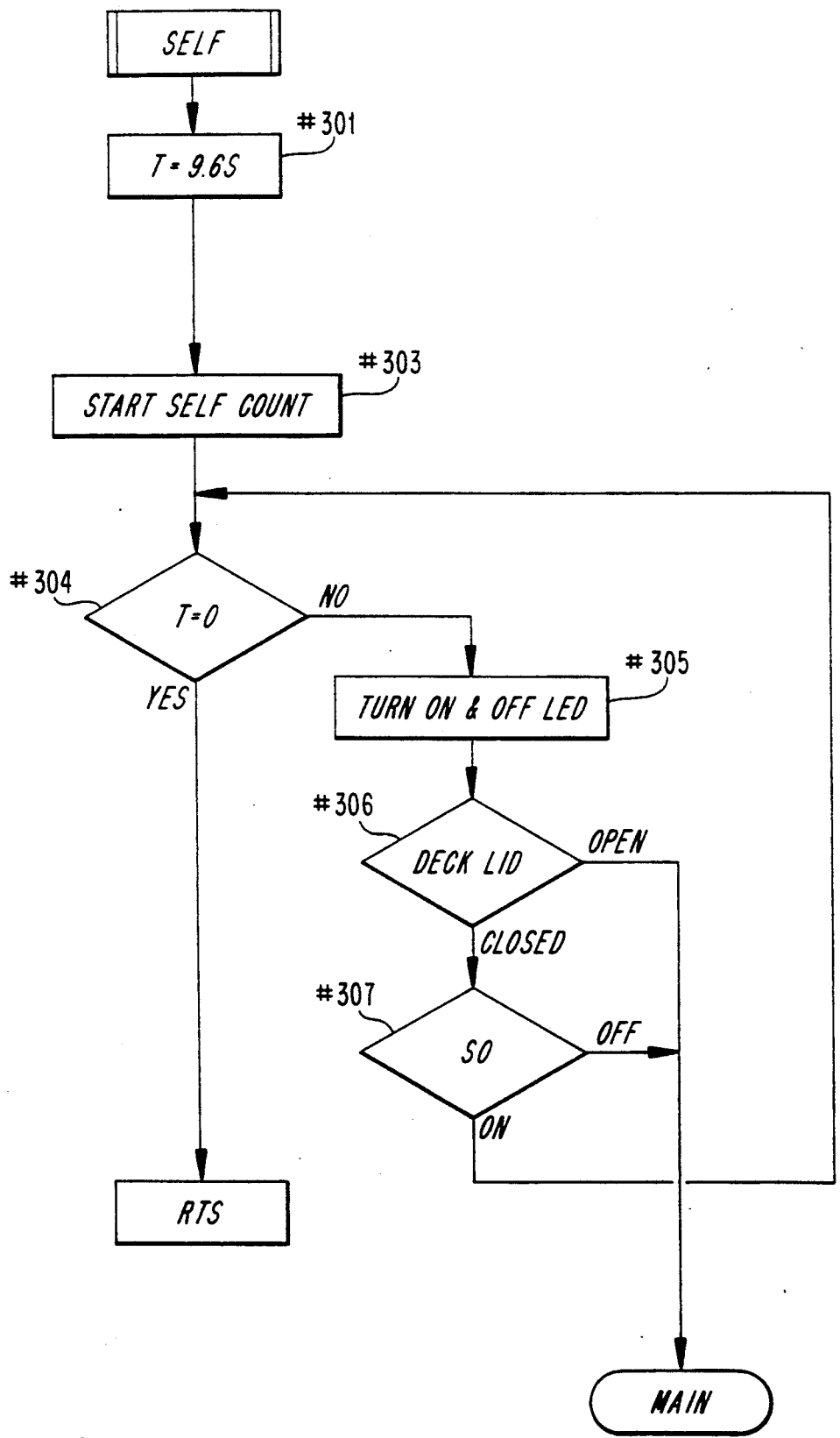
FIG. 7 is a further embodiment of a sequence of the switch S1.

Now, a sequence of the self mode at step #70 will be described with reference to FIG. 7.

The time T of the timer is set at 9.6 seconds (step #301), and self count are started (step #303). During the count of the timer, LED is turned ON and OFF so as to indicate that the self count is now going on (step #305). When the deck lid is opened or the main switch S0 is opened during the sound recording at steps #306 and #307, it is regarded as an intention of stopping the sound recording from the beginning, the program returning to the main flow chart. When the timer is counted up, the program going to step #71 in S1 sequence.

Figure 8A:
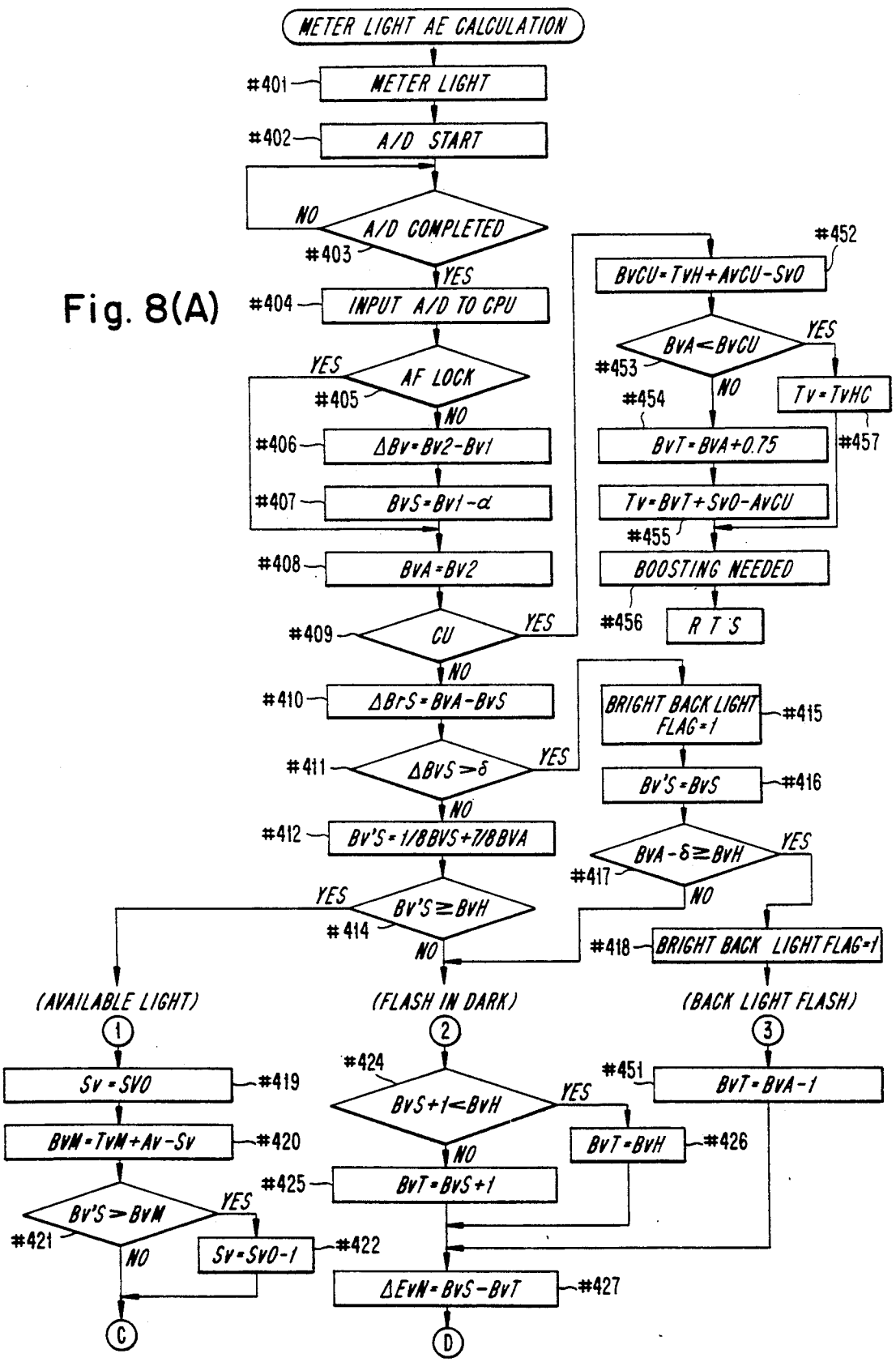
FIGS. 8(A) and 8(B) is a flow chart of a sequence of a self mode in the embodiment of FIG. 7.
Figure 8B:
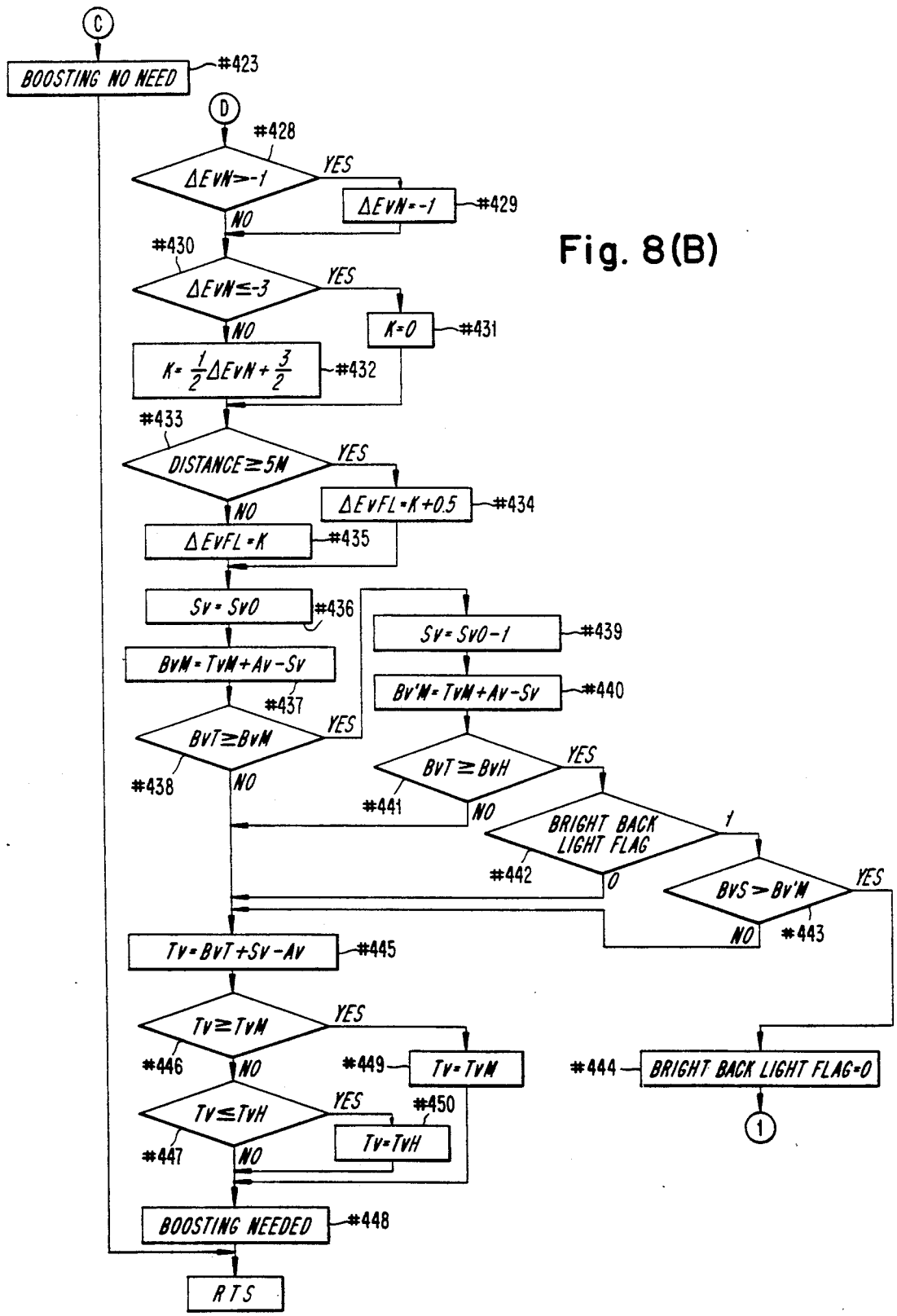

No, the light metering and AE calculation sequence at step #66 in the abovementioned S1 sequence will be described with reference to FIG. 8.

Firstly, the object luminance is metered by light metering elements SP, AVE and the light metering circuits 16, 17 (step #401). The analogue data obtained by the light metering are A/D converted in a A/D converting circuit 18, and the resulted data are inputted into the CPU 1 (steps #402 to #404). Then it is checked whether the switch S1 is in AF lock when kept in the pressed state (step #405). When the answer is NO, the brightness difference $\Delta Bv$ is calculated by substracting the brightness value Bv1 metered in the central part (spot) from the brightness value Bv2 metered in the peripheral part average (step #406). The brightness BvS of the main object is calculated by subtracting a predetermined correction value $\alpha$ corresponding to the brightness difference $\Delta Bv$ from the brightness value of the spot (step #407). And the abovementioned average brightness value Bv2 is regarded as the brightness BvA of the background, namely, the subordinate objects (step #408). Further, when it is AF lock at step #405, the program advances to step #408 without treating steps #406 and #407. It is in AF lock at step #405 only when the light metering and AE calculation is executed by advancing from step #108 to step #66 in S1 sequence of FIGS. 3 and 4.

Then, it is checked whether the lens is in the close-up state or not (step #409). When the answer is NO, the difference between the brightness BvA of the subordinate objects and the brightness BvS of the main object, which difference is the degree $\Delta BvS$ of back light is calculated (step #410). Then this value $\Delta BvS$ is compared with the back light detecting level $\delta$ (step #411). When $\Delta BvS$ is smaller than $\delta$, the degree of back light is regarded as being small (namely, it being in follow light), and the weighted brightness BvS' of the main object is calculated using a formula $\frac{1}{8} BvS + \frac{7}{8} BvA$ (step #412). On the other hand, when $\Delta BvS$ is larger than $\delta$ at step #411, the brightness of back light is regarded as being large (namely, it being in back light), and a back light flag is put up and set "1" (step #415), and BvS is regarded as BvS' (step #416). Such weighting is carried out by the weighting circuit 20 (FIG. 1).

Next, when the operation of the abovementioned step #412 is completed, it is judged whether BvS' is above the brightness BvH at the limit of camera shake, that is, the limit slow shutter speed causing no camera shake to get a correct exposure (step #414). When the answer is YES, it is judged to be brighter than the brightness at the limit of camera shake, and the program goes in a available light photographing mode (1). When the answer at step #414 is NO, it is judged to dark and the program goes in a mode (2) of flashlight photographing in the dark. When the operation of step #416 is executed, it is judged whether the value obtained by subtracting the back light detectging level $\delta$ from the brightness BvA of the subordinate objects is above the brightness BvH at the limit of camera shake (step #417). When the answer is YES, it is judged to be in bright back light, and a bright back light flag is put up and set "1" (step #418). Then, the program goes in a back light photographing mode (3). On the other hand, when the answer is NO at step #417, it is judged to be in back light with dark background, and the program goes in the mode (2) of flashlight photographing in the dark.

Now, the available light photographing mode (1) will be described. In this mode, ISO sensitivity (corresponding to a film sensitivity) SvO in the initial setting determined according to a CCD 31 which is regarded as the sensitivity value Sv (step #419). And the maximum brightness BvM which can control the correct exposure when the object brightness is very high is represented by the following formula using the maximum shutter speed TvM, a value corresponding to the aperture value of a lens and a value Sv corresponding to the sensitivity of a CCD (all being apex values) (step #420).

$$BvM = TvM + Av - Sv$$

Then, the value BvS' obtained in the abovementioned step #412 is compared with the abovementioned value BvM (step #421). When BvS' is larger than BvM, it is excessively bright and therefore SvO-1 is used as the sensitivity value Sv (step #422). When BvS' is not larger than BvM, the operation of step #422 is omitted and it is judged that boosting is not necessary (step #423), the program goes to S1 sequence.

Now, the mode (2) of flashlight photographing in the dark will be described in the following. In this mode (2), a value obtained by adding 1Ev to the brightness BvS of the main object is compared with the brightness BvH at the limit of camera shake (step #424). When BvS + 1 is not smaller than BvH, the controlled brightness value BvT is set at the value obtained by adding 1Ev to the brightness BvS of the main object (step #425). By these steps, a main object only in the available light is photographed to be in a brightness lower by 1Ev than the correct value. On the other hand, when BvS + 1 is smaller than BvH, the main object is dark, and therefore, the controlled brightness value BvT is set at the brightness BvH at the limit of camera shake (step #426).

Further, in order to calculate a correction value of flashlight exposure, a value $\Delta$ EvN indicating the difference by which the brightness of a main object photographed only in the available light is lower than the correct brightness value is calculated from the difference between the brightness BvS of the main object and the abovementioned controlled brightness value BvT (step #427). Then it is detected whether the value $\Delta$ EvN is larger than $-1$ Ev or not (step #428). When $\Delta$ EvN is larger than $-1$ Ev, $\Delta$ EvN is set at $-1$ Ev (step #429). Then, it is detected whether $\Delta$ EvN is below $-3$ Ev (step #430). When $\Delta$ EvN is below $-3$ Ev, the correction value K is set "0" (step #431). When $\Delta$ EvN is not below $-3$ Ev, that is, when $\Delta$ EvN is $-1$ to $-3$, the correction value K is set ($\frac{1}{2}$) $\Delta$ EvN $+(3/2)$ (step #432). Then, it is detected whether the distance of the main object is 5 m or above 5 m (step #433). When it is above 5 m, the correction value $\Delta$ EvFl for flashlight exposure is set at a value obtained by 0.5 to the abovementioned correction value K (step #434). When it is below 5 m, the correction value $\Delta$ EvFL for flashlight exposure is set at the abovementioned correction value K (step #435).

Next, ISO sensitivity SvO in the initial setting is set at the value Sv of ISO sensitivity of the CCD 31 (step #436), and further, the maximum brightness BvM which can control the correct exposure in the highest brightness is set as represented by the following formula using the highest shutter speed TvM, the aperture value Av of a lens and the abovementioned sensitivity value Sv (step #437).

$$BvM = TvM + Av - Sv$$

After that, it is judged whether the abovementioned controlled brightness value BvT is above the maximum brightness BvM capable of controlling the correct exposure (step #438). When the BvT is above BvM, it is bright and the ISO sensitivity Sv is set at SvO-1 (step #439). And similarly the maximum brightness BvM' capable of controlling correct exposure at this time is set at TvM + Av - Sv (step #440). Then it is judged again whether the controlled brightness value BvT is above the maximum brightness BvM' capable of controlling correct exposure (step #441). When BvT is above BvM', the bright back light flag is checked (step #442). When the bright back light flag is put up, the brightness BvS of the main object is compared with the abovementioned maximum brightness value BvM' (step #443). When BvS is larger than BvM', though being in back light, the brightness of the main object is high and a flashlight is not required. Then, the bright back light flag is set "0" (step #444) and the program goes into the avaiable light photographing mode (1).

When the answers at steps #438, #441, and #443 are NO and the bright back light flag is "0" at step #442, the program goes to step #445, and the timing TV of emitting flashlight is set as represented by the following formula using the controlled brightness value BvT, the ISO sensitvity value Sv and the aperture value Av of the lens.

$$Tv = BvT + Sv - Av$$

Further, it is judged whether the abovementioned timing Tv of emitting flashlight is above the maximum shutter speed TvM or not (step #446). When Tv is below TvM, it is judged whether the timing Tv is below the shutter speed TvH at the limit of camera shake (step #447). When Tv is above TvH, the value Tv calculated at the abovementioned step #445 is kept unchanged and a flag is for indicating that boosting is needed is put up (step #448), then the program going to S1 sequence. Further, the answers at steps #446 and #447 are YES, Tv is set at TvM (step #449) and at TvH (step #450) respectively, then the program going to step #448.

Now, the mode (3) of flashlight photographing in back light will be described in the following. In this mode (3), the brightness BvA-1 of the subordinate objects is used as the controlled brightness value BvT (step #451). Thereby, when the main object is subject to the correct exposure, the background is photographed so as to be brighter by 1 Ev. After executing the operation of step #451, the program goes to the abovementioned step #427, and then the similar operation is carried out.

Further, when the lens is in the close-up state at the abovementioned step #409, the program goes to step #452, and the brightness value BvCU at the limit of camera shake is set as represented by the following formula using the shutter speed TvH at the limit of camera shake, the aperture value AvCU of the lens in the close-up state and the ISO sensitivity SvO set in the initial setting.

$$BvCU = TvH + AvCU - SvO$$

Then, this brightness value BvCU at the limit of camera shake are compared with the brightness BvA of the subordinate objects (step #453). When BvA is larger than BvCU, the controlled brightness value BvT is set at the brightness BvA of the subordinate objects +0.75 (step #454). And the timing Tv of emitting flashlight is set as represented by the following formula using the abovementioned BvT, the ISO sensitvity SvO set in the initial setting and the aperture value AvCU of the lens in the close-up state (step #455).

$$Tv = BvT + SvO - AvCU$$

And boosting is required (step #456), the program returning to S1 sequence. Further, when BvA is smaller than BvCU, the shutter speed TvHC at the limit of camera shake with the lens being in the close-up state is used as the timing Tv of emitting flashlight (step #457), and the program goes to the abovementioned step #456.

Figure 9:
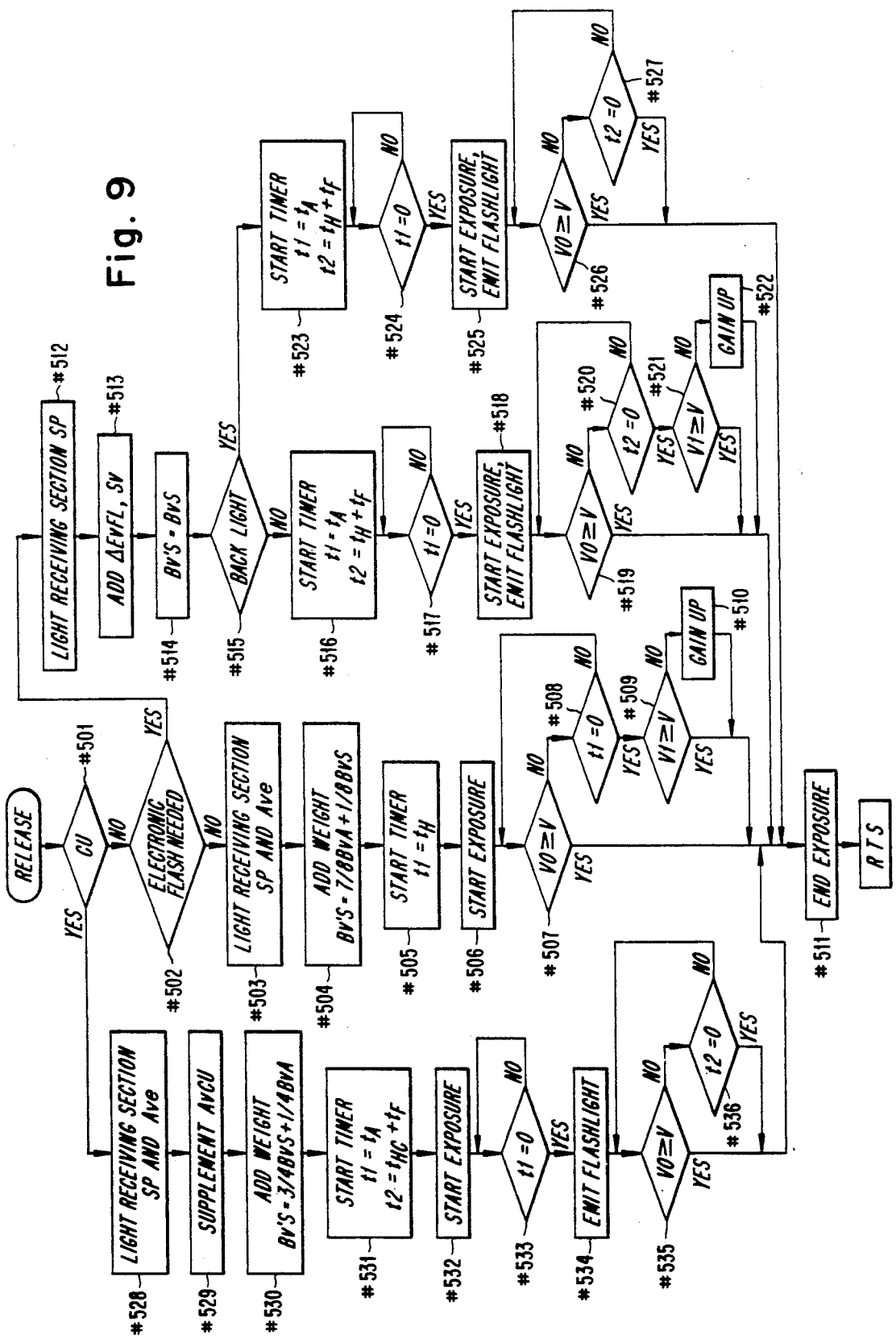
FIG. 9 is a flow chart of a sequence of a release.

Now, a release sequence in S1 sequence will be described in the following with reference to FIG. 9. This release is controlled according to the result of the abovementioned light metering and AE calculation.

When the lens is not in the close-up state and it is not required to emit electronic flashlight (NO at steps #501, #502), available light photographing is adopted and by using brightness data with respect to the central spot (SP) and the peripheral part (AVE) of the light receiving section (step #503), the weight value BvS' obtained at step #412 of the abovementioned light metering and AE calculating sequence is added (step #504). This addition of the weight value is executed by the weighting circuit 20 according to an instruction from the CPU 1 shown in FIG. 1. Then, the timer t1 is set at the time $t_H$ at the limit of camera shake, and exposure is started with starting of the timer (step #505, #506). Here, the equation $t_H = 2^{-TvH}$ is obtained.

After starting the exposure, a reference potential VO for setting a correct exposure in the circuit 28 for controlling the opening time of the shutter shown in FIG. 1 is compared with the controlled potential V changing with the abovementioned weight addition, and the exposure is stopped when VO becomes equal to or larger than V (VO≦V) (step #511). When the time t1 of the timer becomes 0 before VO becomes equal to or larger than V (YES at step #508), the reference potential V1 (>VO) is compared with the controlled potential V (step #509). When V1>V (NO at step #509), the object is still dark and the exposure is not satisfactory even when the time at the limit of camera shake has passed. Therefore, gain is raised by a predetermined value in the gain control detecting circuit 24 (step #522) and the exposure is ended (step #511). Further, when V1 is larger than V at step #509 (YES at step #509), the exposure is ended without changing the gain (step #511). After ending the exposure, the program goes to step #75 of S1 sequence.

On the other hand, when emitting electronic flashlight is required (YES at step #502), the brightness data of only the central spot (SP) of the light receiving section is used (step #512), and the values ΔEvFL and Sv obtained in the above are added as the correction values (step #513), further the value BvS' obtained at step #416 being adopted (step #514). It is judged from the abovementioned bright back light flag whether it is back light or not (step #515). When it is not back light (the bright back light flag=0), the following steps #516 to #522 are executed, and when it is back light (the bright back light flag=1), the steps #523 to #527 are executed, whereby the exposure is ended (step #511).

In either of these treatments, $t1 = t_A$ and $t2 = t_H + t_F$ are set. Here, $t_A = 2^{-Tv}$ indicates the time up to the emission of the flashlight. $t_H = 2^{-TvH}$ indicates the time at the limit of camera shake, and $t_F$ indicates the time during which the flashlight is being emitted. Then, with the start of the timer, available light exposure is started and at the time when t1 becomes 0, exposure by emitting flashlight is started.

Relating to operation after the exposure by emitting flashlight is started, when it is not back light, the operation is the same as the case of the available light exposure except only that a timer t2 is used instead of the timer t1, and when it is back light, it is brighter than the case of not being back light and therefore the exposure is ended immediately at the time when the timer t2 becomes O without treating the question whether gain is raised or not (step #511).

Further, when the lens is in the close-up state, operations of steps #528 to #536 are executed and the exposure is ended (step #511). In this operation, similarly to the abovementioned step #503, the brightness data relating to the central spot (SP) and the peripheral part (Ave ) of the light receiving section are used, a correction value of AvCU being added, further, a weight value BvS' according to a formula BvS'=($\frac{3}{4}$)BvS+($\frac{1}{4}$)BvA being added (step #530), and then the similar operations to steps #523 to #527 in back light are executed. Here, the time $t_{HC}$ of at the limit of camera shake in the close-up state is based on the equation $t_{HC} = 2^{-TvHC}$.

In the abovementioned embodiment, a weight value is added in the close-up mode and the available light mode, but it may be added in the back light mode, and the value may be separately determined.

As being apparent from the abovementioned description, according to the present invention, sound recording in the self timer photographing mode is carried out not after the completion of video recording but during the self timer counting, and therefore, both of the self timer photographing and the usual photographing in which the self mode is not selected can be completed in a similar time, whereby the mobility of the camera can be improved. Further, the timings of the sound recording and the video recording can be adequately changed over automatically according to a selection of the abovementioned photographing mode by a user, whereby the operational ability of the camera can be also improved.

What is claimed is:

1. A camera having a sound recording function comprising;
   a means for controlling exposure by opening and closing a shutter, and photographing images,
   a sound recording means,
   a self timer means for opening the shutter after a predetermined time,
   a selecting means for selecting either of a self mode in which the self timer means is used and a usual mode, and
   a sequence changeover means which , in accordance with the operation of the selecting means, operates the sound recording means after completion of photographing when the self mode is not selected, and operates the sound recording means during self timer counting before photographing when the self mode is selected.

2. A camera having a sound recording function comprising:
   a means for controlling exposure by opening and closing a shutter, and photographing an image,
   a means for recording sounds for a predetermined time in relation to the image recording operation,
   a switch which is operated during sound recording for resetting a recorded audio content, and
   a means for controlling re-recording of sounds which starts the sound recording operation again from the beginning when the switch is operated.

3. A camera having a sound recording function comprising:
   an image recording means for recording images,
   a sound recording means for recording sounds,
   an operating means for changing over photographing modes between a first mode in which sound recording is executed corresponding to the image recording and a second mode in which sound recording is not executed, and
   a means for, when the operating means is operated during sound recording, judging this operation to be an input information instructing to elongate the sound recording time, and elongating the sound recording time by a predetermined unit time.

4. A camera having a sound recording function comprising:
   an image recording means for recording images,
   a sound recording means for recording sounds,
   switching means for supplying electronic energy to the camera thereby enabling operation of said image recording means and said sound recording means, and
   an operating means which operates under a condition in which the electronic energy is supplied for starting the operation of storing sounds in the sound memory by being operated prior to the initiation of photographing, and when operated again during the operation of sound recording, stopping the operation of the sound inputting means.

5. A camera having a sound recording function comprising:
   an image recording means for recording images,
   a means for storing sounds in a sound memory,
   a sound recording means for recording the stored sounds on a recording medium, and
   a manual operating means for, when operated during the operation of storing sounds in the sound memory, stopping the operation of the sound storing means, and at the same time forbidding the operation of the sound recording means and nullifying the stored sound signal while the image recording is carried out.

6. A camera having a sound recording function comprising:
   a means for recording images and sounds in interlocked relation to each other,
   a sound memory in which inputted sounds are temporarily stored,
   a sound recording circuit for recording the stored sounds in the sound memory in a floppy disk,
   an image recording circuit for recording the image in the floppy disk, and
   a driving means for driving the floppy disk, wherein the sound recording circuit and the driving means are kept stopped at least for a time from the beginning to the end of the operation of inputting sounds into the sound memory, and thereafter, the sound recording circuit and the driving means are actuated for the sound recording, while the image recording circuit and the driving means are actuated during the operation of exposure so as to record the image data on the floppy disk, immediately.

7. A camera having a sound recording function comprising:
   a means for recording image information,
   sound inputting means for executing a sound input operation wherein a microphone picks up ambient sounds,
   a sound recording means for recording sound signal transferred thereto, and an arrangement in which a recording mode in which sounds are recorded and a non-recording mode in which sounds are not recorded can be changed over to each other, and further a single mode in which images are recorded on a single frame of an image recording medium and a continuous photographing mode in which images are continuously recorded on a plurality of frames of the image recording medium can be changed over to each other, wherein, the sound input operation is started after the continuous photographing operation is completed, when the recording mode and the continuous photographing mode are selected at the same time.

8. A camera having a sound recording function comprising:

a means for recording image information, a sound recording means for recording sound inputted thereinto, a means for changing over between a recording mode in which sounds are recorded and a non-recording mode in which sounds are not recorded , and a means for changing over between a single mode in which images are recorded on a single frame of an image recording medium and a continuous photographing mode in which images are continuously recorded on a plurality of frames of the image recording medium , wherein, the sound input operation is executed during said continuous photographing mode, when the recording mode and the continuous photographing mode are selected at the same time while the sound input operation is executed after the image recording when the recording mode and the single mode are selected at the same time.

9. A camera having a sound recording function comprising:

a sound recording means for recording sound inputted thereto, a means capable of executing continuous photographing operation, a flash provided inside or outside the camera, a control means for executing sound input operation after or during the continuous photographing operation, and a means for detecting an uncharged state of the flash during the continuous photographing operation, wherein, when the flash in in the uncharged state, said control means terminates the continuous photographing operation and causes a sound input operation corresponding to said continuous photographing operation to be subsequently executed.

10. A camera having a sound recording function comprising:

an image recording means for recording images, a sound recording means for recording sounds, and a manual operating means for, when operated during the operation of recording sound, stopping the operation of the sound recording means and nullifying the sound recorded from the beginning to stopping the operation of the sound recording means, while the operation of said image recording means is controlled to completion.

11. A camera as claimed in claim 4, wherein said means which is to be operated prior to the initiation of photographing includes a member for starting a photographing sequence.

12. A camera as claimed in claim 7, further comprising:

a flash provided inside or outside the camera, and a means for detecting an uncharged state of the flash during the continuous photographing operation, wherein, when the flash is in the uncharged state, said control means terminates the continuous photographing operation and causes a sound input operation corresponding to said continuous photographing operation to be subsequently executed.

13. A camera as claimed in claim 8, further comprising:

a flash provided inside or outside the camera, and a means for detecting an uncahrged state of the flash during the continuous photographing operation, wherein, when the flash is in the uncharged state, said control means terminates the continuous photographing operation and causes a sound input operation corresponding to said continuous photographing operation to be subsequently executed.

* * * * *

UNITED STATES PATENT AND TRADEMARK OFFICE
CERTIFICATE OF CORRECTION

PATENT NO. : 5,099,262
DATED : March 24, 1992
INVENTOR(S) : Yoshito Tanaka, et al.

It is certified that error appears in the above-identified patent and that said Letters Patent is hereby corrected as shown below:

On the title page, the following information is added:

[30]     Foreign Application Priority Data

Aug. 4, 1988   [JP]   Japan ..................... 63-195584
Aug. 30, 1988  [JP]   Japan ..................... 63-215776

Signed and Sealed this

Twenty-ninth Day of June, 1993

MICHAEL K. KIRK

Attest:

Attesting Officer        Acting Commissioner of Patents and Trademarks